US012514591B2

(12) United States Patent
Okada et al.

(10) Patent No.: US 12,514,591 B2
(45) Date of Patent: Jan. 6, 2026

(54) CARTRIDGE SYSTEM, CARTRIDGE, AND LOADING METHOD OF CLIP UNIT

(71) Applicant: OLYMPUS MEDICAL SYSTEMS CORP., Tokyo (JP)

(72) Inventors: Tsutomu Okada, Tachikawa (JP); Toshinori Tamura, Hirosaki (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 210 days.

(21) Appl. No.: 18/339,673

(22) Filed: Jun. 22, 2023

(65) Prior Publication Data

US 2025/0127518 A1   Apr. 24, 2025

Related U.S. Application Data

(63) Continuation of application No. PCT/JP2020/048359, filed on Dec. 24, 2020.

(51) Int. Cl.
*A61B 17/128* (2006.01)
*A61B 17/122* (2006.01)

(52) U.S. Cl.
CPC ........ *A61B 17/1285* (2013.01); *A61B 17/122* (2013.01)

(58) Field of Classification Search
CPC .............. A61B 17/122; A61B 17/1222; A61B 17/1285; A61B 17/1227; A61B 17/128
See application file for complete search history.

(56) References Cited

U.S. PATENT DOCUMENTS 7,727,247 B2 * 6/2010 Kimura .............. A61B 17/1285
606/142
8,480,685 B2 * 7/2013 Kimura .............. A61B 17/1285
606/139
(Continued)

FOREIGN PATENT DOCUMENTS

JP      2009011769 A    1/2009
JP      2009011852 A    1/2009
(Continued)

OTHER PUBLICATIONS

"International Application Serial No. PCT/JP2020/048359, International Search Report dated Mar. 23, 2021", w/ English Translation, (Mar. 23, 2021), 5 pgs.
(Continued)

*Primary Examiner* — Ryan J. Severson
(74) *Attorney, Agent, or Firm* — Schwegman Lundberg & Woessner, P.A.

(57) ABSTRACT

A cartridge system includes a clip unit having a plurality of arms being openable and closeable; and a connection member that is connectable with a power transmission portion inserting through a sheath, and a case having an accommodation region in which the clip unit is accommodated; a distal-end opening provided at a distal-end side of the accommodation region and into which the clip unit is insertable; a proximal-end opening provided at a proximal-end side of the accommodation region and into which the sheath is insertable; and a locking portion configured to allow a movement of the clip unit being inserted from the distal-end opening toward the accommodation region and regulate a movement of the clip unit from the accommodation region toward the distal-end opening.

20 Claims, 25 Drawing Sheets

(56) References Cited

U.S. PATENT DOCUMENTS

| | | | |
|---|---|---|---|
| 9,585,674 B2* | 3/2017 | Terada | B21D 53/36 |
| 12,232,741 B2* | 2/2025 | Yoshii | A61B 17/32056 |
| 2005/0143767 A1* | 6/2005 | Kimura | A61B 50/30 |
| | | | 606/158 |
| 2007/0112359 A1* | 5/2007 | Kimura | A61B 17/1222 |
| | | | 606/142 |
| 2013/0072947 A1 | 3/2013 | Terada | |
| 2021/0290245 A1* | 9/2021 | Yoshii | A61B 17/32056 |
| 2022/0370073 A1* | 11/2022 | Okada | A61B 17/105 |
| 2022/0370075 A1* | 11/2022 | Tamura | A61B 17/1227 |
| 2022/0401106 A1* | 12/2022 | Okada | A61B 17/1222 |
| 2023/0035426 A1* | 2/2023 | Tamura | A61B 17/1227 |
| 2023/0277190 A1* | 9/2023 | Lu | A61B 17/122 |
| | | | 606/142 |
| 2024/0108355 A1* | 4/2024 | Uesaka | A61B 50/30 |
| 2024/0260968 A1* | 8/2024 | Okada | A61B 17/00234 |
| 2024/0260969 A1* | 8/2024 | Okada | A61B 17/1285 |
| 2024/0325028 A1* | 10/2024 | Okada | A61B 17/1222 |
| 2025/0000499 A1* | 1/2025 | Yorita | A61B 17/1285 |
| 2025/0127518 A1* | 4/2025 | Okada | A61B 17/128 |
| 2025/0176971 A1* | 6/2025 | Yoshii | A61B 17/12013 |

FOREIGN PATENT DOCUMENTS

| | | |
|---|---|---|
| JP | 2010012171 | 1/2010 |
| JP | 3159939 U | 6/2010 |
| JP | 2013063107 A | 4/2013 |
| JP | 2017217206 A | 12/2017 |

OTHER PUBLICATIONS

"Chinese Application No. 202080108144.2, Office Action dated Aug. 4, 2025", w English Translation, Aug. 4, 2025, 25 pgs.

* cited by examiner

CARTRIDGE SYSTEM, CARTRIDGE, AND LOADING METHOD OF CLIP UNIT

The present application is a continuation application of PCT International Application No. PCT/JP2020/048359, filed on Dec. 24, 2020. The content of the above-identified PCT International Applications is incorporated herein by reference.

TECHNICAL FIELD

The present disclosure relates to a cartridge system accommodating an endoscopic clip unit, a cartridge accommodating an endoscopic clip unit, and a loading method of an endoscopic clip unit.

BACKGROUND ART

In an endoscopic treatment, a clip unit capable of ligating the resection portion after the treatment to perform the hemostasis and the like is used. The clip unit includes a clip to clamp the resection portion, a pressing tube to accommodate the clip and lock the clip in a closed state, and the like. The clip unit is introduced to the treatment site by an introduction device being insertable into a channel of an endoscope.

A cartridge is used at the time of attaching the clip unit to the introduction device. For example, a cartridge configured to accommodate a clip unit having the self-expanding force is disclosed in Japanese Utility Model Application No. 3159939.

SUMMARY

According to an aspect of the present disclosure, a cartridge system includes a clip unit having a plurality of arms being openable and closeable; and a connection member that is connectable with a power transmission portion inserting through a sheath, and a case having an accommodation region in which the clip unit is accommodated; a distal-end opening provided at a distal-end side of the accommodation region and into which the clip unit is insertable; a proximal-end opening provided at a proximal-end side of the accommodation region and into which the sheath is insertable; and a locking portion configured to allow a movement of the clip unit being inserted from the distal-end opening toward the accommodation region and regulate a movement of the clip unit from the accommodation region toward the distal-end opening.

According to another aspect of the present disclosure, a cartridge for accommodating a clip unit including a plurality of arms being openable and closeable and a connection member being connectable with a power transmission portion inserting through a sheath, the cartridge includes a case having an accommodation region in which the clip unit is accommodated; a distal-end opening provided at a distal end side of the accommodation region and into which the clip unit is insertable; a proximal-end opening provided at a proximal-end side of the accommodation region and into which the sheath is insertable; and a locking portion configured to allow the clip unit that is inserted from the distal-end opening to move toward the proximal-end side to pass therethrough, and regulate a passage of the clip unit moving to the distal-end side toward the distal-end opening.

According to a further aspect of the present disclosure, a loading method of a clip unit for loading a clip unit into a clip introduction device having a sheath, the loading method includes inserting the sheath into a case having a distal-end opening into which the clip unit is insertable and in which the clip unit is accommodated; moving a power transmission portion inserting through the sheath toward the clip unit in a state in which the sheath is inserted into the case; moving the clip unit in a direction approaching the distal-end opening by abutting the power transmission portion to the clip unit; and connecting the clip unit and the power transmission portion by regulating the clip unit from passing through the distal-end opening by a locking portion provided in the Case.

DESCRIPTION OF EMBODIMENTS

First Embodiment

A cartridge system 100 according to a first embodiment of the present disclosure will be described with reference from FIG. 1 to FIG. 29. The cartridge system 100 includes a clip unit 1 and a cartridge 5 accommodating the clip unit 1. The cartridge system 100 is an assistance system for facilitating loading the clip unit 1 in a clip introduction device 200.

[Clip Introduction Device 200]

Figure 1:
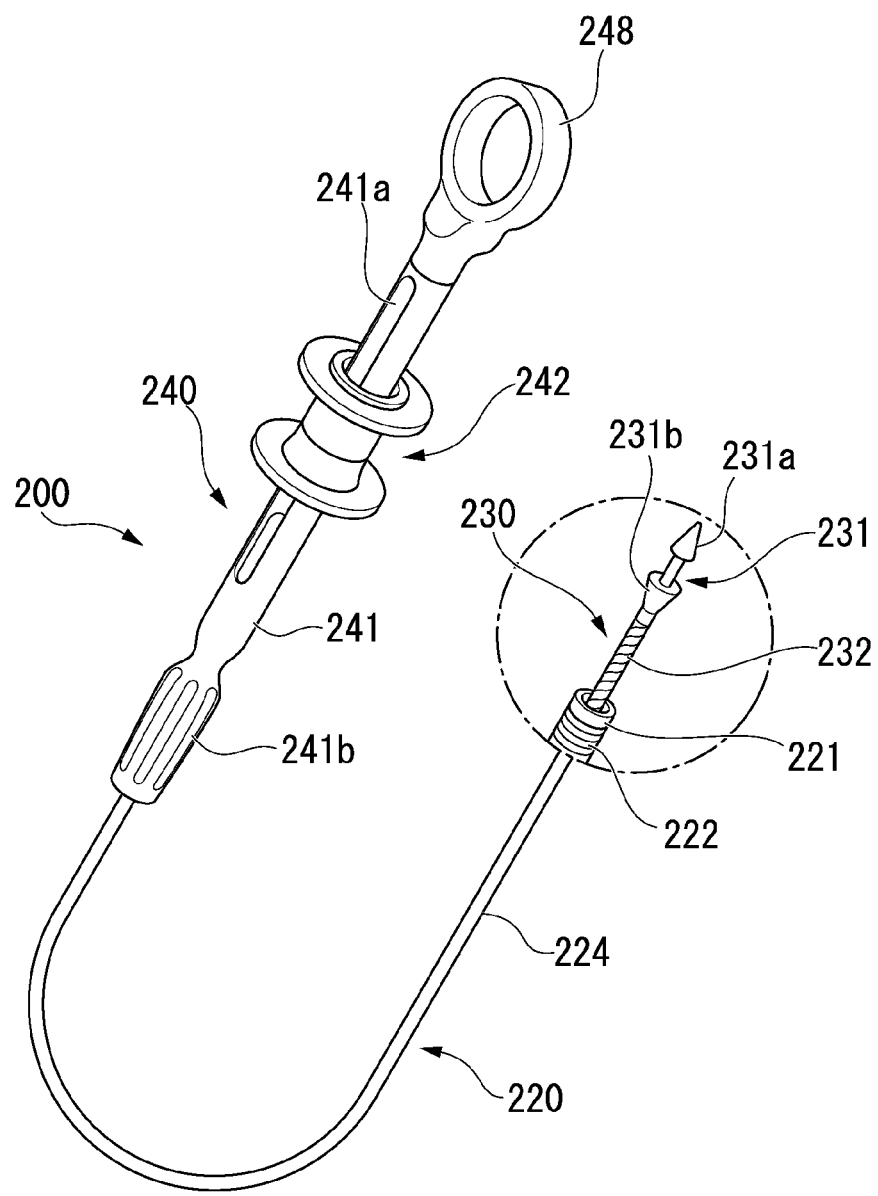
FIG. 1 is a perspective view showing a clip introduction device of a cartridge system according to a first embodiment.

FIG. 1 is a perspective view showing the clip introduction device 200.

The clip introduction device 200 includes a sheath 220, an operation wire 230, and an operation portion 240. For example, the clip introduction device 200 is inserted through a treatment device insertion channel of an endoscope to be used in combination with the endoscope. Accordingly, the sheath 220 is formed to be enough longer than the length of the treatment device insertion channel of the endoscope. The sheath 220 has the flexibility and bends following the bending of an insertion portion of the endoscope.

The sheath 220 includes a distal-end tip 221, a distal end side coil 222, and a hand-side coil 224, and the sheath 220 is formed in an elongated tubular shape as a whole. The distal-end side coil 222 is disposed at the distal-end portion side of the sheath 220. The distal-end tip 221 is disposed in the distal-end portion of the distal-end side coil 222.

As shown in FIG. 1, the operation wire (power transmission portion) 230 includes an arrowhead hook portion (connection portion) 231 that is connected to the clip unit 1, and an operation wire 232 configured to operate the arrowhead hook portion 231.

The arrowhead hook portion 231 includes an engagement portion 231a formed in a substantially conical shape to engage with the clip unit 1, and a wire connection portion 231b provided at the proximal end of the engagement portion 231a. The arrowhead hook portion 231 is formed, for example, of the metal material such as the stainless steel or the like.

The wire 232 is inserted through the sheath 220 to be freely advanceable and retractable through the sheath 220. The distal-end portion of the wire 232 is fixed to the proximal end of the wire connection portion 231b by welding, for example.

As shown in FIG. 1, the operation portion 240 includes an operation portion main body 241, a slider 242, and a thumb ring 248. For example, the operation portion main body 241 is formed of the resin material by the injection molding. The operation portion main body 241 includes a slit portion 241a and a rotation grip 241b at the distal-end side. The slit portion 241a is supported by the slider 242 to be advanceable and retractable.

The slider 242 is attached to be advanceable and retractable in a longitudinal direction of the operation portion main body 241, and the proximal end of the wire 232 is attached to the slider 242. The slider 252 advances and retracts along the operation portion main body 241 such that the wire 232 advances and retracts with respect to the sheath 220, and the arrowhead hook portion 231 advances and retracts.

The thumb ring 248 is attached to the proximal end of the operation portion main body 241 to be rotatable around the longitudinal direction of the operation portion main body 241.

[Clip Unit 1]

Figure 2:
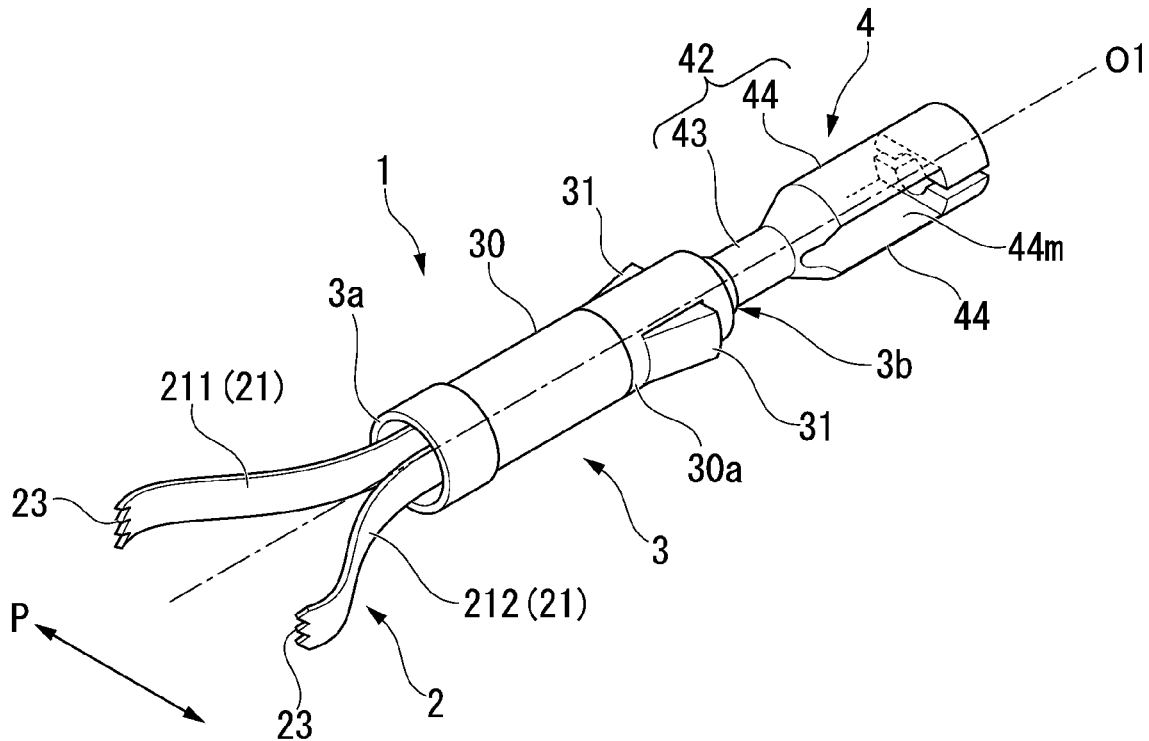
FIG. 2 is a perspective view showing a clip unit of the cartridge system.
Figure 3:
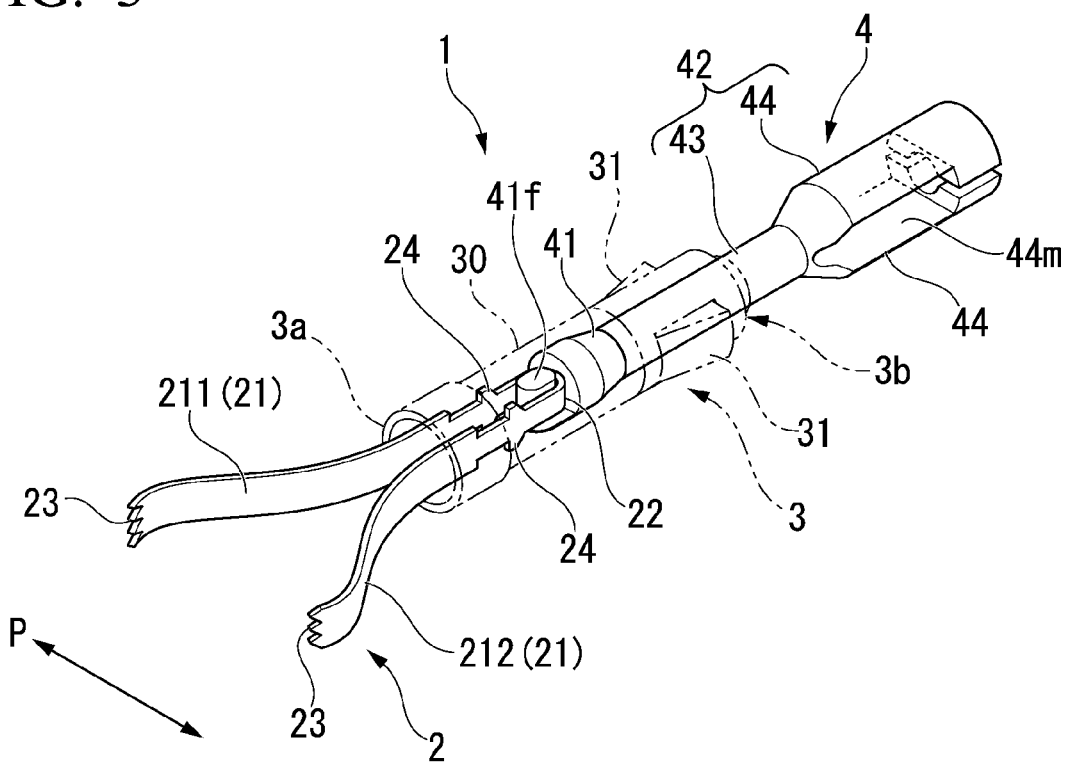
FIG. 3 is a perspective view showing the clip unit by transparently showing a pressing tube.

FIG. 2 is a perspective view showing the clip unit 1 of the cartridge system 100 according to the present embodiment. FIG. 3 is a perspective view showing the clip unit 1 by transparently showing the pressing tube 3. The clip unit 1 includes the clip 2, the pressing tube 3 as a tightening member, and a connection member 4.

The clip 2 is, for example, formed by bending a metal plate member formed of the stainless steel or the like such as a leaf spring material or the like at a central portion thereof. The clip 2 includes a pair of arms 21 that are openable and closeable and a connection portion connecting the pair of arms 21.

The pair of arms 21 includes a first arm 211 and a second arm 212. The first arm 211 and the second arm 212 are arranged symmetrically with respect to the central axis O1 in the longitudinal direction of the clip unit 1. The tissue grasping portions 23 facing each other are formed at the distal ends of the pair of arms 21, respectively. The tissue grasping portions 23 are formed by inwardly bending the distal ends of the pair of arms 21.

The engagement portions 24 protruding in a direction being orthogonal to the central axis O1 are formed at the proximal-end side of the first arm 211 and the proximal-end side of the second arm 212, respectively. A portion of the engagement portion 24 at side of the tissue grasping portion 23 is an inclined surface with an acute angle, and a portion of the engagement portion 24 at the side of the connection portion 22 is an inclined surface with an obtuse angle.

The first arm 211 and the second arm 212 are formed at the proximal-end side thereof by the connection portion 22, and the first arm 211 and the second arm 212 are provided to be freely openable and closeable toward the distal-end side. The connection portion 22 is bent to be formed in a U-shape and connected to the connection member 4. The connection portion 22 is biased to make the pair of arms 21 to become an open state. Accordingly, the pair of arms 21 of the clip 2 have the self-expanding force with the open-close direction P.

The pressing tube 3 includes a pressing tube main body 30 formed in a tubular shape, and protruding-recessing wings 31. The pressing tube main body 30 is formed of a material being softer than that of the clip 2, for example, the pressing tube main body 30 is formed by performing the injection molding using the resin material having the suitable elasticity and high rigidity such as the PPA (polyphthalamide), the PA (polyamide) or the like. Also, the pressing tube main body 30 is not only formed of the resin material with the high rigidity, but also may be formed of the metal.

The protruding recessing wings 31 are a pair of convex portions that protrude and recess with respect to an outer circumferential surface 30a of the pressing tube main body 30. The protruding-recessing wings 31 are arranged at the two sides sandwiching the central axis O1. The protruding-recessing wings 31 have a protruding state of protruding outwardly in the radial direction with respect to the outer circumferential surface 30a as a basic posture. By receiving a force from the outside toward the inside in the radial direction, the protruding-recessing wings 31 become a recessing state with respect to the outer circumferential surface 30a. By releasing the above-described force, the protruding-recessing wings 31 returns to the protruding state from the recessing state.

The connection member 4 is connected to the connection portion of the clip 2. Also, the connection member 4 is connected to the arrowhead hook portion 231 inserting through the sheath 220. In other words, the connection member 4 is configured to connect the clip 2 and the arrowhead hook portion 231. The connection member 4 includes an insertion portion 41 that is inserted into the inside space of the pressing tube 3 and a connection portion 42 that is provided at the proximal side of the insertion portion 41.

The insertion portion 41 includes a hook 41f at the distal-end portion thereof. The hook 41f is a hook extending in the direction orthogonal to the central axis O1 and formed in an approximately cylindrical rod shape. The connection portion 22 of the clip 2 is hooked on the hook 41f. The hook 41f is broken when the connection portion 22 is pulled toward the proximal-end side such that a breaking force due to the pulling from 20 N (newton) to 60 N, for example, is applied to the hook 41f.

The connection portion 42 is the engagement portion to which the arrowhead portion 231 of the clip introduction device 200 is engaged (connected). The connection portion 42 includes a connection portion main body 43 and an elastic arm portion 44.

The elastic arm portion 44 is provided at the proximal end of the connection portion main body 43 and divided into a bifurcation shape. The elastic arm portion 44 is elastically deformable with respect to the connection portion main body 43 to be openable and closeable with respect to the connection portion main body 43. A notch portion 44m is formed in the elastic arm portion 44 to grasp and accommodate the engagement portion 231a of the arrowhead hook portion 231. The notch portion 44m is formed in a shape being in close contact with the outer circumferential surface of the engagement portion 231a of the arrowhead hook portion 231.

Next, the functions of the clip unit 1 will be described.

The connection portion 22 of the clip 2 is inserted into the inside space of the pressing tube 3 from the distal-end opening 3a to be connected with the connection member 4. The connection portion 22 is pulled toward the proximal-end side of the pressing tube 3 by the connection member 4 such that the pair of arms 21 are retracted into the pressing tube 3 and the pair of arms 21 are gradually closed. In this state, when the pulling force of the connection portion 22 is released, the clip 2 moves toward the distal-end side while returning to the open state with the self-expanding force of the pair of arms 21 as a restoration force.

The connection portion 22 is further pulled to the proximal-end side of the pressing tube 3 such that the engagement portion 24 is pulled until the proximal-end side than the proximal-end opening 3b. The portion at the side of the connection portion 22 of the engagement portion 24 is formed in the inclined surface with the obtuse angle such that it is easy to pull the engagement portion 24 until the proximal-end side than the proximal-end opening 3b. On the other hand, the portion at the side of the tissue grasping portion 23 of the engagement portion 24 is formed in the inclined surface with the acute angle such that when the engagement portion 24 is pulled to the proximal-end side than the proximal-end opening 3b, the engagement portion 24 and the proximal-end opening 3b are engaged with each other. As a result, it is impossible for the engagement portion 24 to invade the inside space of the pressing tube 3 and the pair of arms 21 are locked in the closed state. When the pair of arms 21 are locked in the closed state, it is impossible for the pair of arms 21 to return to the open state.

[Cartridge 5]

Figure 4:
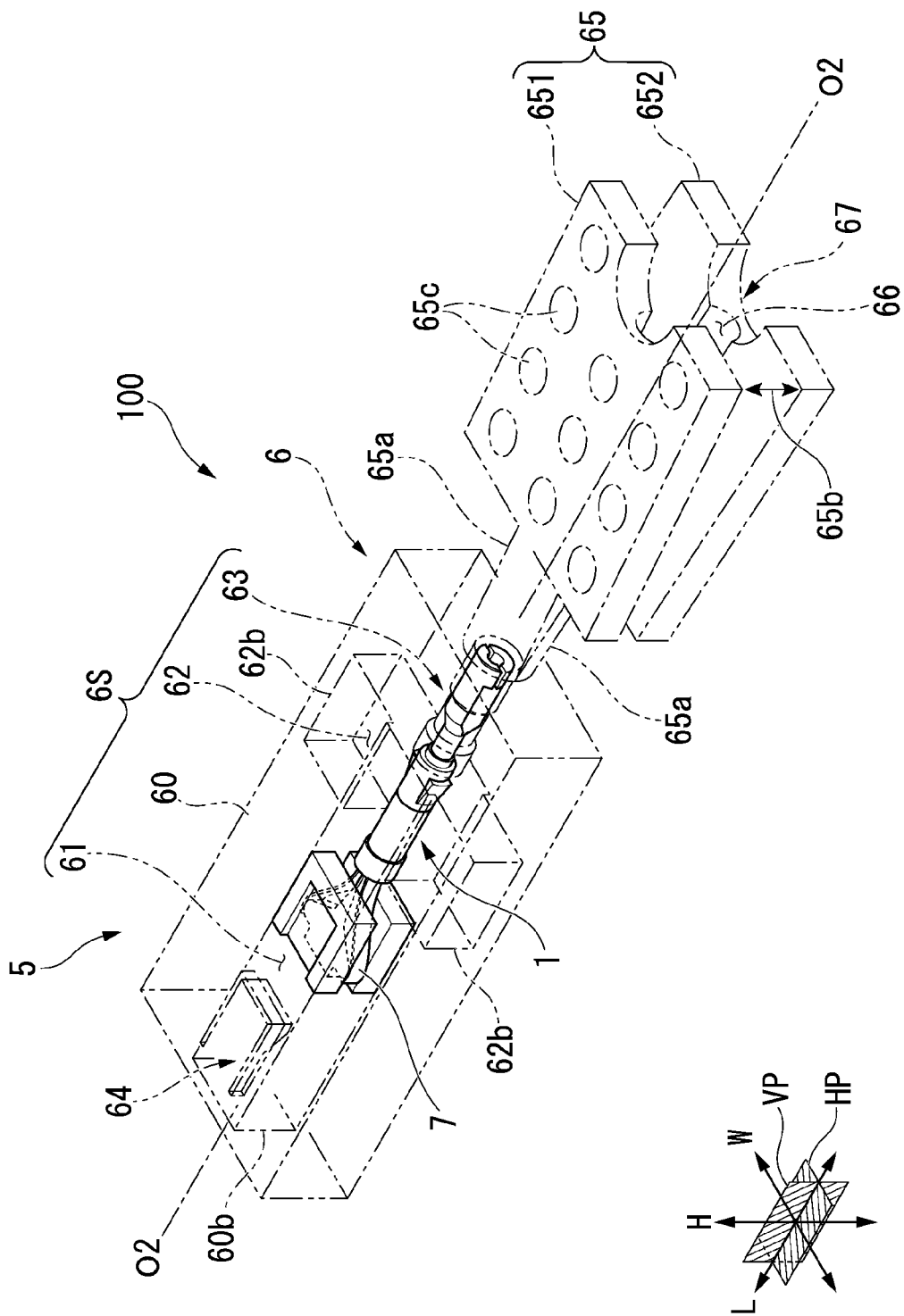
FIG. 4 is a perspective view showing a cartridge accommodating the clip unit.
Figure 5:
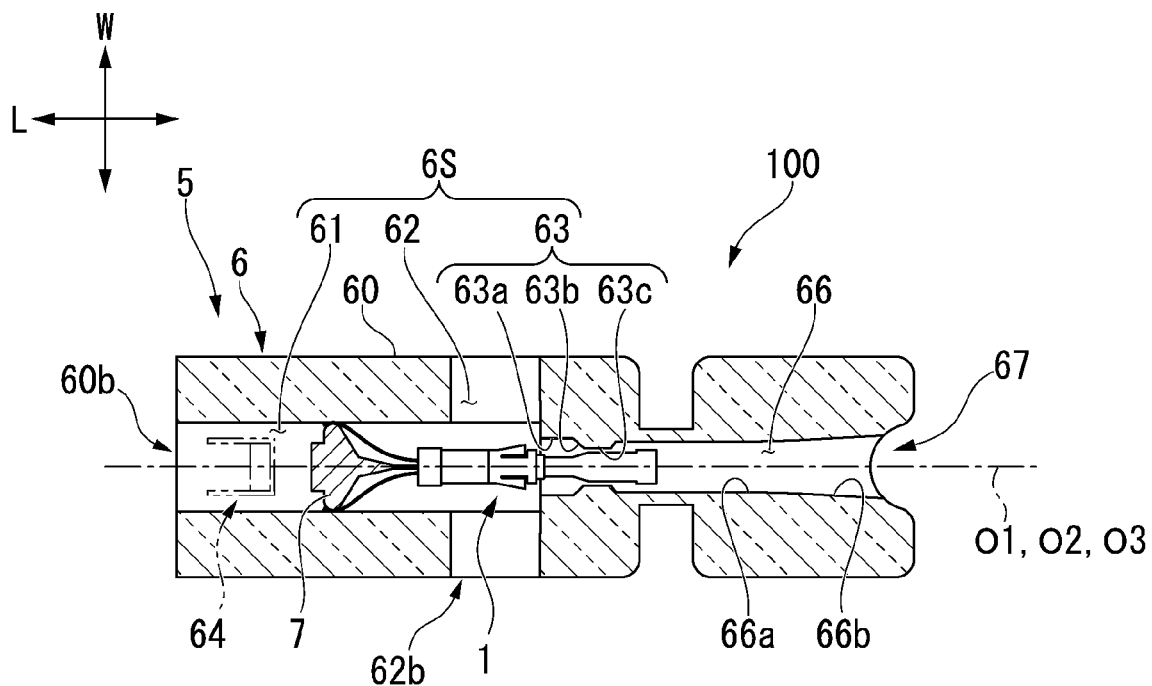
FIG. 5 is a cross-sectional view showing the cartridge accommodating the clip unit.

FIG. 4 is a perspective view showing the cartridge 5 accommodating the clip unit 1. FIG. 5 is a cross-sectional view accommodating the clip unit 1. The cartridge 5 includes a case 6 and a regulating member 7. The cartridge 5 is formed in a shape suitable to be held by the hand, wherein the length of the cartridge 5 in the longitudinal direction L is approximately 50 mm, the width thereof is approximately from 10 mm to 20 mm, and the thickness (height) thereof is approximately 5 mm.

As shown in FIG. 4, the two directions being orthogonal to the longitudinal direction L of the cartridge 5 while being orthogonal to each other are defined as a "width direction W" and a "height direction H". A plane being horizontal to the longitudinal direction L and the width direction W is defined as a "horizontal plane HP". A plane being horizontal to the longitudinal direction L and the height direction H is defined as a "vertical plane VP", In the cartridge 5 accommodating the clip unit 1, the side of the pair of arms 21 is defined as the distal-end side of the cartridge 5, and the side of the connection member 4 is defined as the proximal-end side of the cartridge 5.

The case 6 includes a case main body 60, a squeezing portion 65, and a sheath connection portion 66. The case 6 is manufactured by performing the injection molding using the resin material having the suitable rigidity and being transparent, such as ABS, PC, PP, PS, acrylic, cycloolefin polymer, and the like. The case 6 is formed by using the transparent resin material such that it is simple for the user to determine whether the clip unit 1 exists inside the case 6.

The case main body 60 is formed in a rectangular box shape. The length of the case main body 60 in the width direction W is longer than the length of the case main body 60 in the height direction H.

An accommodation region 6S in which the clip unit 1 is accommodated to be moveable in the longitudinal direction L is formed. The accommodation region 6S includes a first region 61, a second region 62, and a folding portion 63. As shown in FIG. 5, the first region 61, the second region 62, and the folding portion 63 are arranged in this sequence from the distal end toward the proximal end in the longitudinal direction L. The first region 61, the second region 62, and the folding portion 63 are the inside space being symmetrically formed with respect to the vertical plane VP including the central axis O2 in the longitudinal direction L of the cartridge 5.

Figure 6:
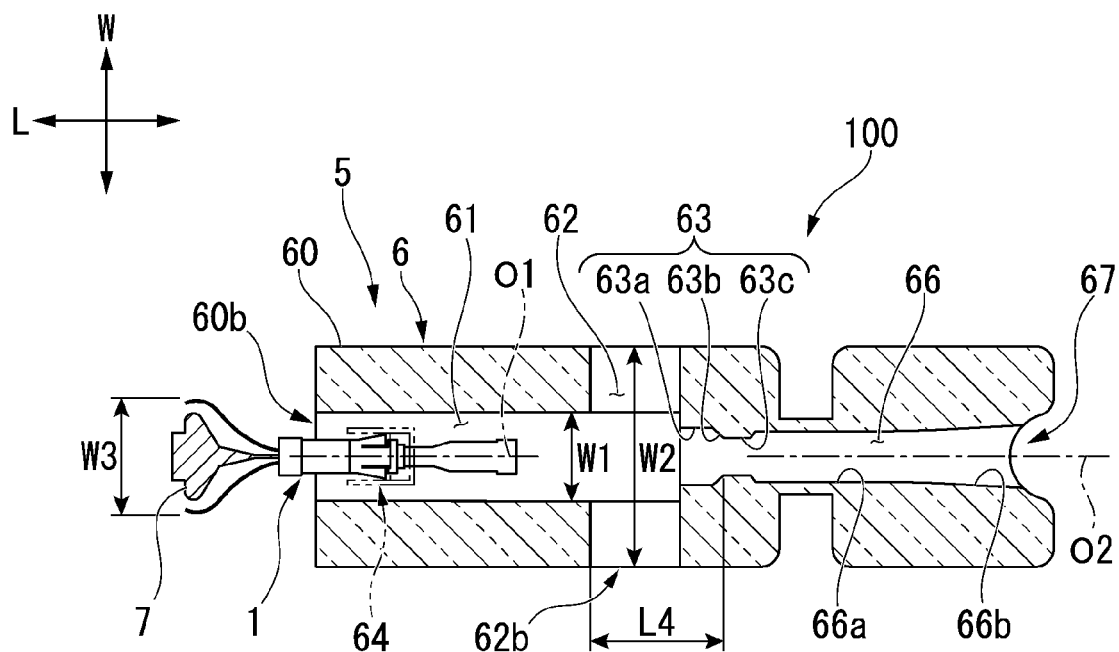
FIG. 6 is a cross-sectional view showing the cartridge before accommodating the clip unit.

FIG. 6 is a cross-sectional view showing the cartridge 5 before accommodating the clip unit 1.

The clip unit 1 is accommodated in the accommodation region 6S from the distal end opening 60b formed at the distal-end side of the accommodation region 68 of the case main body 60. The clip unit 1 is accommodated into the cartridge 5 from the connection member 4 side.

As shown in FIG. 6, the clip unit 1 is accommodated in the accommodation region 6S by aligning the central axis O1 of the clip unit 1 with the longitudinal direction L. The clip unit 1 is accommodated in the accommodation region 6 by coinciding the open-close direction of the pair of arms 21 with the width direction W of the case 6.

The first region 61 is the inside space in which the clip unit 1 is accommodated to be moveable along the longitudinal direction L. The first region 61 communicates with the second region 62. The first region 61 includes the locking portion 64.

Figure 7:
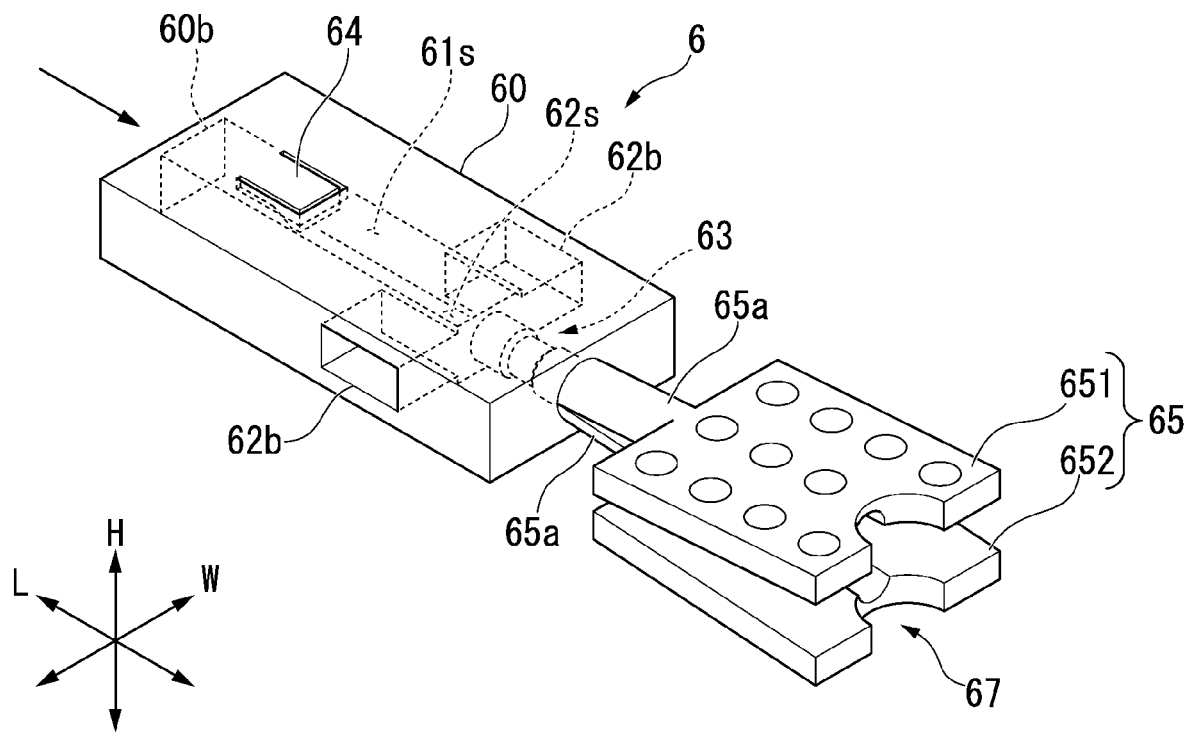
FIG. 7 is a perspective view showing a case in which the clip unit is not accommodated.

FIG. 7 is a perspective view showing the case 6 in which the clip unit 1 is not accommodated.

The locking portion 64 is formed at the distal-end side of the first region 61, and formed at the side (upper side) in the height direction H.

Figure 8:
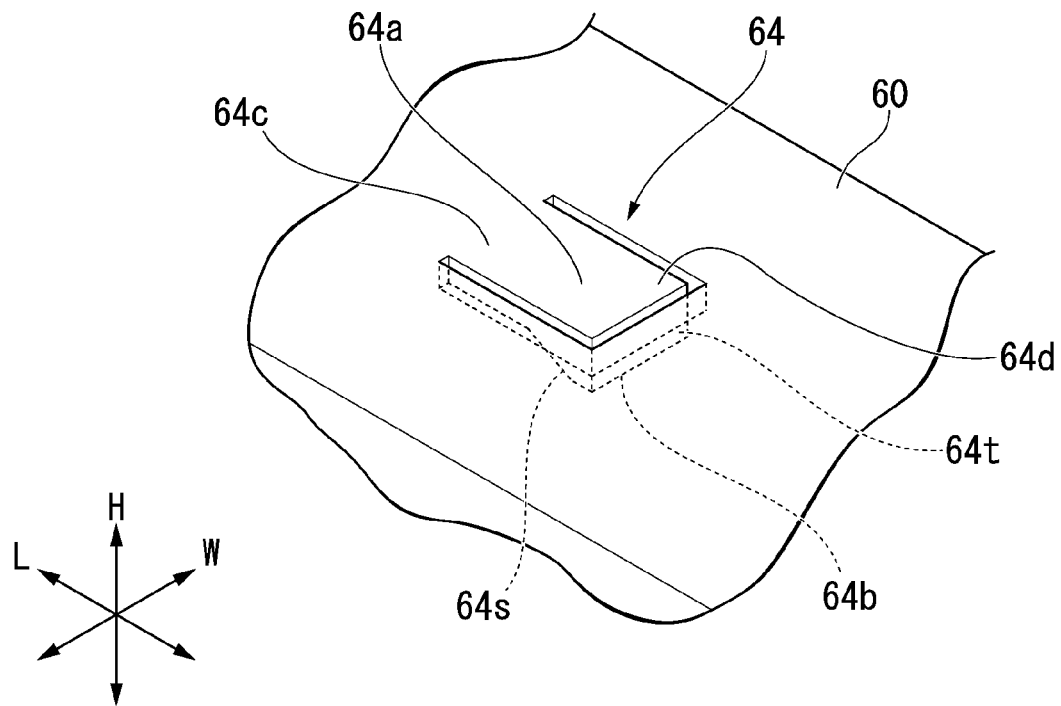
FIG. 8 is a perspective view showing a locking portion of the case.

FIG. 8 is a perspective view showing the locking portion 64.

The locking portion 64 includes the elastic deformation portion 64a and the locking convex portion 64b. The elastic deformation portion 64a is formed in a flat plate shape and only the end portion 64c at the distal-end side in the longitudinal direction L is fixed to the case main body 60. The elastic deformation portion 64a is configured to elastically deform as a cantilever beam with the end portion 64c fixed to the case main body 60 as the fixing end.

Figure 9:
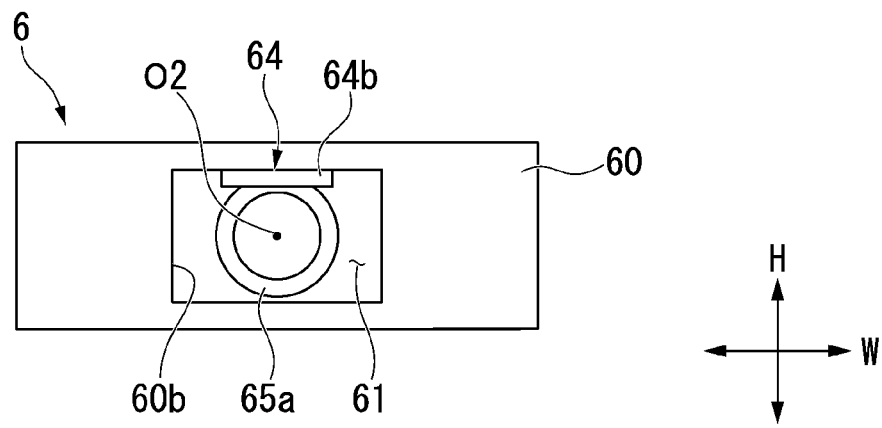
FIG. 9 is a front view showing the same case when viewed in an arrowhead direction shown in FIG. 7.

FIG. 9 is a front view of the case 6 when viewed from the arrowhead direction shown in FIG. 7.

The locking convex portion 64b is provided in the end portion 64d at the proximal-end side of the elastic deformation portion 64a in the longitudinal direction L. As shown in FIG. 9, the locking convex portion 64b protrudes to the side of the first region 61 of the accommodation region 6S in a state in which there is no external force is applied (initial state). The Locking convex portion 64b includes an inclination surface 64s and a locking surface 64t.

The inclination surface 64s is formed at the distal-end side in the locking convex portion 64b in the longitudinal direction L. The inclination surface 64s is inclined with respect to the central axis O2, and the normal line of the inclination surface 64s is toward the distal-end side of the longitudinal direction L.

The locking surface 64t is formed at the proximal-end side in the locking convex portion 64b in the longitudinal direction L. The locking surface 64t is formed as the plane approximately orthogonal to the central axis O2, and the normal line of the locking surface 64t is toward the proximal-end side of the longitudinal direction L.

The second region 62 is the inside space in which the clip unit 1 is accommodated to be moveable in the longitudinal direction L. The length of the second region in the longitudinal direction L is shorter than the length of the first region 61 in the longitudinal direction L. The second region 62 is communicating with the folding portion 63.

As shown in FIG. 6, the length W1 of the first region 61 in the width direction W is smaller than the opening width W3 of the pair of arms 21 in the open state. The length W2 of the second region 62 in the width direction W is larger than the opening width W3 of the pair of arms 21 in the open state.

The second region 62 includes the openings 62b at the two sides in the width direction W. The edge of the opening 62b is formed in the rectangular shape and extends in the height direction H and the longitudinal direction L.

The folding portion 63 includes a dimeter-enlarging portion 63a, a tapered portion 63b, and a diameter-reducing portion 63c. The dimeter-enlarging portion 63a, the tapered portion 63b, and the diameter-reducing portion 63c are arranged in this sequence from the distal end toward the proximal end.

The diameter-enlarging portion 63a is a region in which the elastic deformation portion 44 of the connection member 4 is allowed to elastically widen (open and close). With regard to the diameter-enlarging portion 63a, when the arrowhead hook portion 231 of the clip introduction device 200 and the connection member 4 of the clip unit 1 are engaged with each other, the elastic arm portion 44 of the connection member 4 is openable and closeable in the direction orthogonal to the central axis O1.

The tapered portion 63b is provided at the proximal-end side of the diameter-enlarging portion 63a and formed in the tapered shape. The tapered portion 63b is formed that the diameter thereof is enlarged from the proximal-end side toward the distal-end side. Accordingly, when the pressing tube 3 is slid from the distal-end side toward the proximal end side, the protruding recessing wings 31 of the pressing tube 3 is accommodated inwardly in the pressing tube main body 30.

The diameter-reducing portion 63c is the region for holding the protruding-recessing wings 31 in the recessing state. As shown in FIG. 5, when the clip unit 1 is accommodated in the cartridge 5, the diameter-reducing portion 63c can hold the elastic arm portion 44 in the state of preventing the widening of the elastic arm portion 44 of the connection member 4.

When the pressing tube 3 slides the tapered portion 63b from the distal-end side toward the proximal-end side, the protruding-recessing wings 31 of the pressing tube 3 are accommodated inwardly in the pressing tube 3. Accordingly, the diameter reducing portion 63c that is smoothly connected with the tapered portion 63b can hold the protruding-recessing wings 31 of the pressing tube 3 in the state of being accommodated (recessing state).

As shown in FIG. 4, the squeezing portion 65 is a plate shaped member provided at the proximal end of the case main body 60. The squeezing portion 65 includes a first squeezing portion 651 and a second squeezing portion 652. The first squeezing portion 651 and the second squeezing portion 652 are provided to face each other in the height direction H of the case 6.

The squeezing portion 65 includes a connection portion 65a being connected with the case main body 60. The connection portion 65a is configured to individually connect the first squeezing portion 651 and the second squeezing portion 652 to the case main body 60. The connection portion 65a is bent such that the first squeezing portion 651 and the second squeezing portion 652 are separated to be apart from each other. Accordingly, a gap 65b is formed between the first squeezing portion 651 and the second squeezing portion 652. The first squeezing portion 651 and the second squeezing portion 652 are further separated from each other at the proximal-end side than at the distal end side.

The first squeezing portion 651 and the second squeezing portion 652 are formed in the dimensions suitable for being picked with fingers, for example, formed in the approximately 20 mm square. A plurality of concave portions 65c in the semi-sphere shape as the anti-slip member during the squeezing are formed on the outside surface of the first squeezing portion 651 and the second squeezing portion 652.

The sheath connection portion 66 is an insertion groove into which the sheath 220 is insertable. The sheath connection portion 66 is the arc-shaped groove formed in the inner surface of the first squeezing portion 651 and the second squeezing portion 652, and the sheath connection portion 66 is communicating with the diameter-reducing portion 63c of the folding portion 63 in the accommodation region 6S. The sheath connection portion 66 includes a straight portion 66a in which the diameter thereof does not change and a tapered portion 66b in which the diameter thereof is gradually increased toward the proximal end opening 67 at the proximal-end side. The sheath 220 enters the straight portion 66a via the tapered portion 66b and abuts to the proximal-end side of the diameter-reducing portion 63c. The inner diameter of the proximal-end opening 67 is, for example, equal to or more than 3 mm.

The user squeezes the first squeezing portion 651 and the second squeezing portion 652 in the state in which the sheath 220 is inserted into the sheath connection portion 66 from the proximal-end opening 67 to fix the sheath 220 with respect to the case 6.

Figure 10:
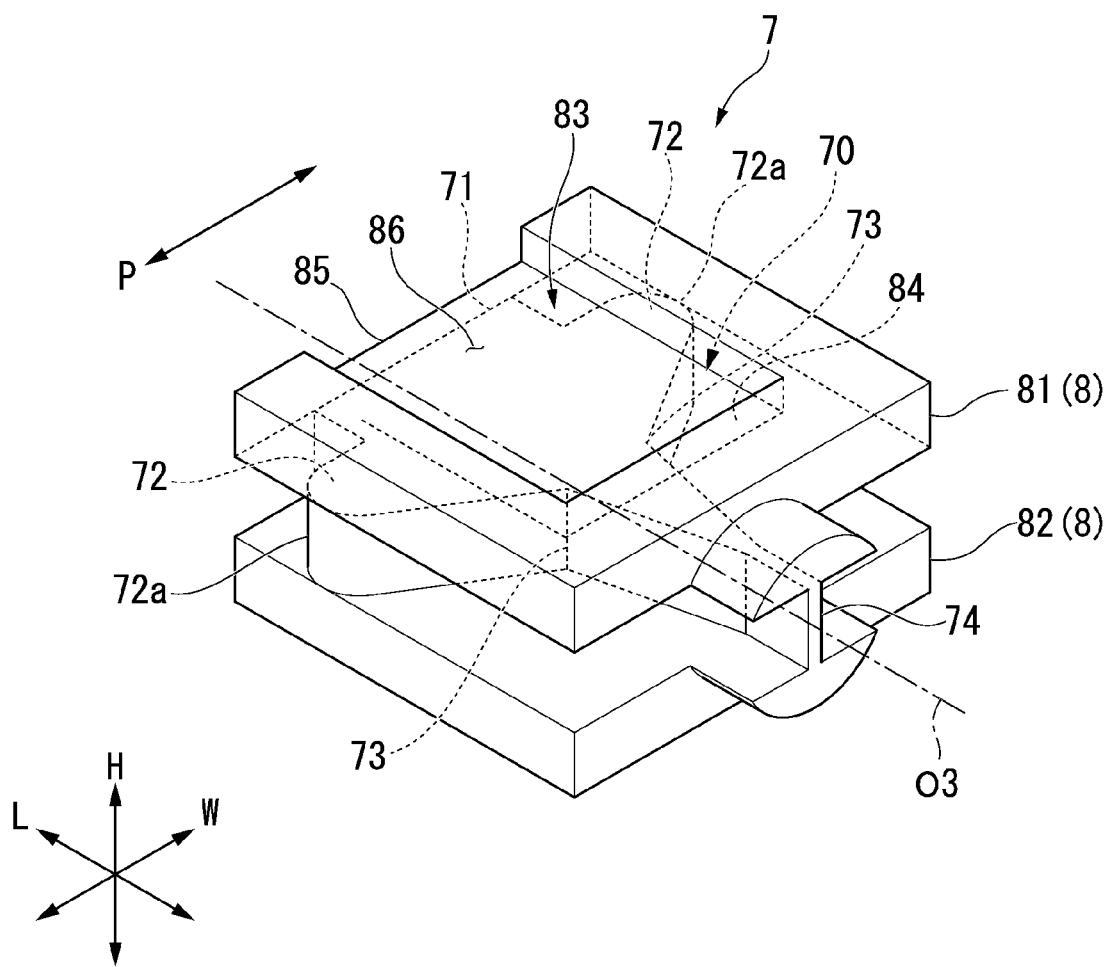
FIG. 10 is a perspective view showing a regulating member of the cartridge.

FIG. 10 is a perspective view showing the regulating member 7.

The regulating member 7 is accommodated together with the clip unit 1 in the first region 61 and the second region 62 to be movable. The regulating member 7 is formed from the same resin with that of the case 6, for example. The regulating member 7 may not be formed from the transparent resin as such of the case 6. As shown in FIG. 10, the regulating member 7 is formed in a symmetrical shape with respect to the vertical plane VP including the central axis O3 in the longitudinal direction L of the regulating member 7.

The regulating member 7 includes a middle-layer member 70 and an auxiliary member 8. The middle-layer member 80 includes a distal-end portion 71, a protruding portion 72, a tapered portion 73, and a pressing portion 74. The distal-end portion 71, the protruding portion 72, the tapered portion 73, and the pressing portion 74 are arranged in this sequence from the distal end toward the proximal end along the central axis O3 direction of the regulating member 7.

Figure 11:
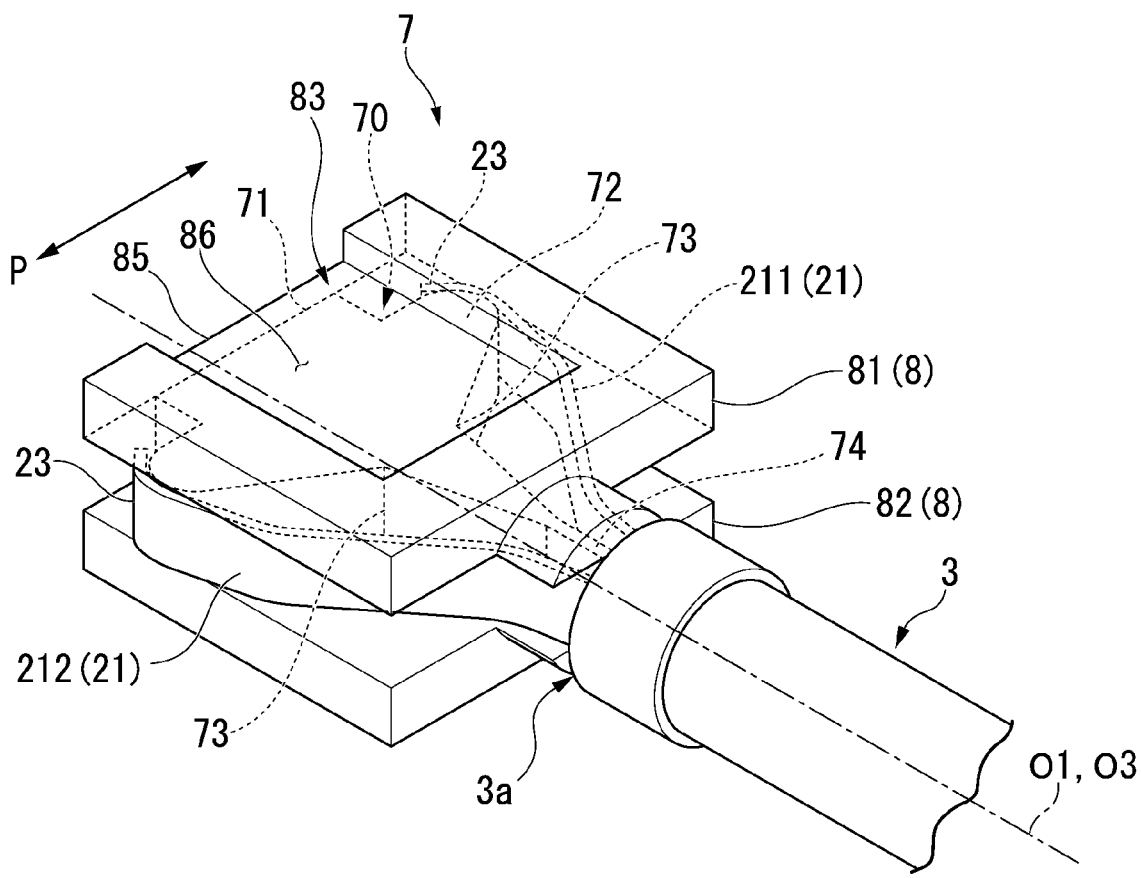
FIG. 11 is a perspective view showing the regulating member that is grasped by a pair of arms.

FIG. 11 is a perspective view showing the regulating member 7 that is grasped by the pair of arms 21.

The regulating member 7 is grasped by the clip 2 by approximately coinciding the central axis O3 with the central axis O1 of the clip unit 1. As shown in FIG. 5, the clip unit 1 is accommodated in the accommodating region 6s in the state in which the clip 2 grasps the regulating member 7. At this time, it is desirable that the central axis O1, the central axis O2, and the central axis O3 are coincided with each other.

The distal-end portion 71 is provided to protrude from the protruding portion 72 toward the distal-end side. The distal end of the distal-end portion 71 is positioned to be more distal than the tissue grasping portion 23 of the clip 2 that grasps the regulating member 7. The distal end of the distal-end portion 71 is formed in the plane being orthogonal to the central axis O3.

The protruding portions 72 are members protruding in the direction orthogonal to the central axis O3 (hereinafter referred to as the "protruding direction P"). The protruding portions 72 are provided at the two sides to sandwich the central axis O3. The protruding portions 72 are grasped by the first arm 211 and the second arm 212. The open-close direction P of the pair of arms 31 grasping the protruding portions 72 is approximately coincided with the protruding portion P of the protruding portions 72. The curvature of the outer circumferential surface of the protruding portions 72 is smaller than the curvature of the inner circumferential surface of the tissue grasping portion 23. Accordingly, the pair of arms 21 can definitely grasp the protruding portions 72.

The tapered portions 73 are members formed in the tapered shape. The tapered portions 73 are provided at the two sides to sandwich the central axis O3. The length of the tapered portions 73 in the protruding direction P is shorter than that of the protruding portions 72. The length of the tapered portions 73 in the protruding portion P becomes shorter as toward the proximal-end side from the distal-end side.

The pressing portion 74 is a plate-shaped member configured to restrict the minimum approaching distance between the clip 2 and the pressing tube 3. The pressing portion 74 is provided at the proximal-end side of the tapered portion 73. The pressing portion 74 engages with the edge of the distal-end opening 3a so as to be impossible to invade into the inside space of the pressing tube 3 from the distal-end opening 3a. Accordingly, even if in the case in which the clip 2 is pulled in the direction to approach the pressing tube 3, the pressing portion 74 engages with the edge of the distal-end opening 3a so as to restrict the minimum approaching distance between the clip 2 and the pressing tube 3.

The auxiliary member 8 is configured to adjust the position of the regulating member 7 in the height direction H such that the protruding portions 72 are grasped by the pair of arms 21. The auxiliary member 8 includes an upper-layer auxiliary member 81 provided at one side (the upper side) in the height direction H and a lower-layer auxiliary member 82 provided at the other side (the lower side) in the height direction H. The middle-layer member 70 is sandwiched by the upper layer auxiliary member 81 and the lower-layer auxiliary member 82 in the height direction H. The auxiliary member 8 is unnecessary in the case when there is no necessity to adjust the position of the regulating member 7 in the height direction H.

The engagement concave portion 83 is formed at one side (the upper side) of the height direction H in the upper layer auxiliary member 81. The engagement concave portion 83 is a concave portion engaging with the locking convex portion 64*b* of the locking portion 64. In the case when the auxiliary member 8 is unnecessary, the engagement concave portion 83 only has to be provided in at least part of the distal-end portion 71, the protruding portions 72, and the tapered portions 73.

The engagement concave portion 83 is formed in the rectangular shape in a planar view viewed from the height direction H. The region in the upper-layer auxiliary member 81 in which the engagement concave portion 83 is not formed is formed in the U-shape in the above-described planar view.

As shown in FIG. 10, the engagement concave portion 83 includes a locking surface 84 to engage with the locking convex portion 64*b* of the locking portion 64 at the proximal-end side in the longitudinal direction L. The locking surface 84 is formed in the plane approximately orthogonal to the central axis O3. On the other hand, the notch portion 85 is formed at the distal-end side in the longitudinal direction L in the engagement concave portion 83. Accordingly, the concave space 86 of the engagement concave portion 83 is communicating with the space at the distal-end side in the longitudinal direction L.

In the case in which the regulating member 7 moves the first region 61 from the proximal-end side toward the distal-end side, the locking surface 64*t* of the locking portion 64 passes through the notch portion 85 and the concave space 86 to abut to the locking surface 84.

Figure 12:
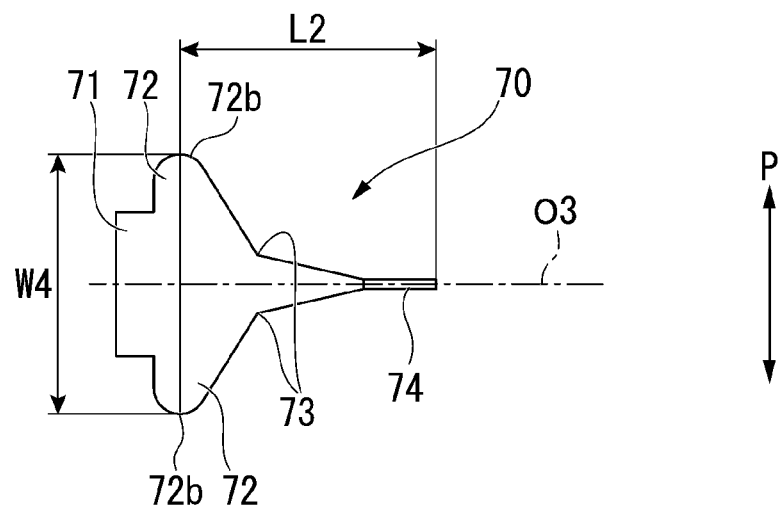
FIG. 12 is a planar view showing a middle layer member of the regulating member.

FIG. 12 is a planar view showing the middle-layer member 70 of the regulating member 7.

In the protruding portions 72, the portion that protrudes most in the protruding direction P from the central axis O3 is referred to as the most-protruding point 72*b*. The length W4 between the most-protruding points 72*b* is slightly smaller than the length W1 of the first region 61 in the width direction w. The length from the most-protruding point 72*b* to the proximal end of the pressing portion 74 in the central axis O3 is referred to as the Length L2.

Figure 13:
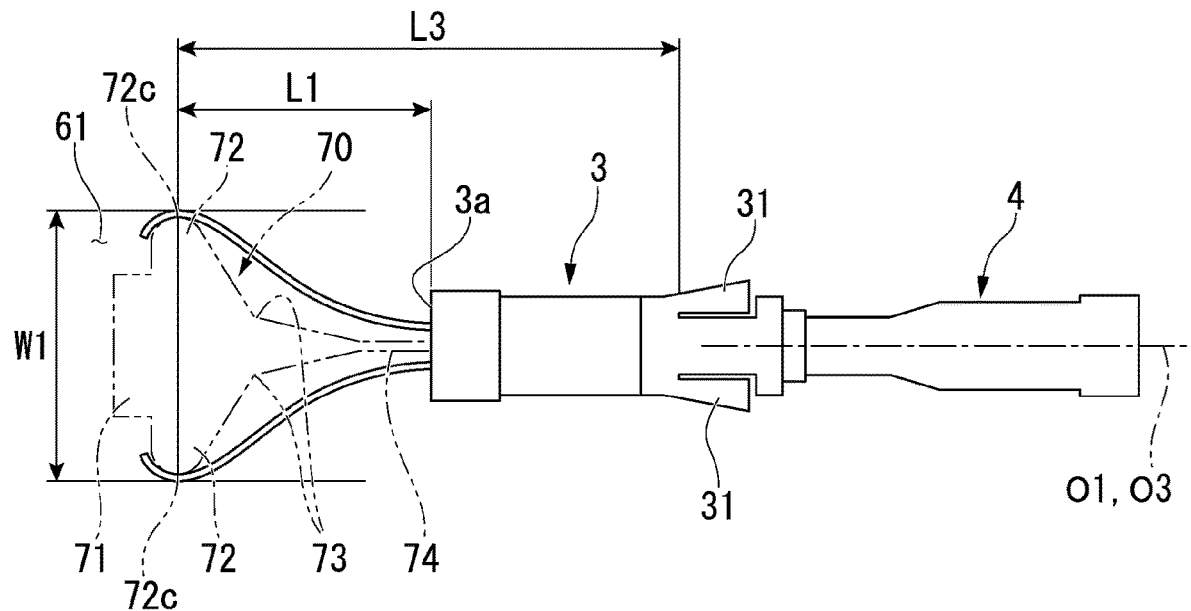
FIG. 13 is a planar view showing the middle layer member that is grasped in a first region.

FIG. 13 is a planar view showing the middle-layer member 70 that is grasped in the first region 61.

The regulating member 7 is accommodated in the first region 61 in the state of being grasped by the pair of arms 21. The length W1 of the first region 61 in the width direction W is shorter than the opening width w3 in the open state of the pair of arms 21. Accordingly, the pair of arms 21 grasp the regulating member 7 from the open state to the closed state. The open width of the pair of arms 21 is at the same degree with the length W1 of the first region in the width direction W. The pair of arms 21 come into contact with the case main body 60 in the open-close direction P. The length in the direction of the central axis O3 from the contact points 72*c* of the pair of arms 21 and the case main body 60 to the proximal end of the pressing portion 74 is defined as the length L1.

The length L1 in the direction of the central axis O3 from the contact points 72*c* to the proximal end of the pressing portion 74 is desirable to be equal to or larger than the length L2 in the direction of the central axis O3 from the most-protruding points 72*b* to the proximal end of the pressing portion 74. The configuration is made for making the clip 2 to definitely engage with the regulating member 7 to be pulled toward the proximal-end side when the clip 2 is pulled toward the proximal-end side.

As shown in FIG. 12 and FIG. 13, the length W4 between the most-protruding points 72*b* is slightly smaller than the length W1 of the first region 61 in the width direction. Accordingly, in the first region, the state in which the regulating member 7 is grasped by the pair of arms 21 is maintained.

The length 13 (see FIG. 13) in the direction of the central axis O1 and the central axis O3 from the contact points 72*c* to the distal ends of the protruding-recessing wings 31 is equal to or larger than the distance L4 (see FIG. 6) from the distal end of the second region 62 to the proximal end of the tapered portion 63*b*.

[Method of Loading Clip Unit 1]

Next, the operations of the cartridge system 100 will be described. FIG. 14 to FIG. 21 are views for describing a method of loading the clip unit 1 into the clip introduction device 200 using the cartridge 5.

Figure 14:
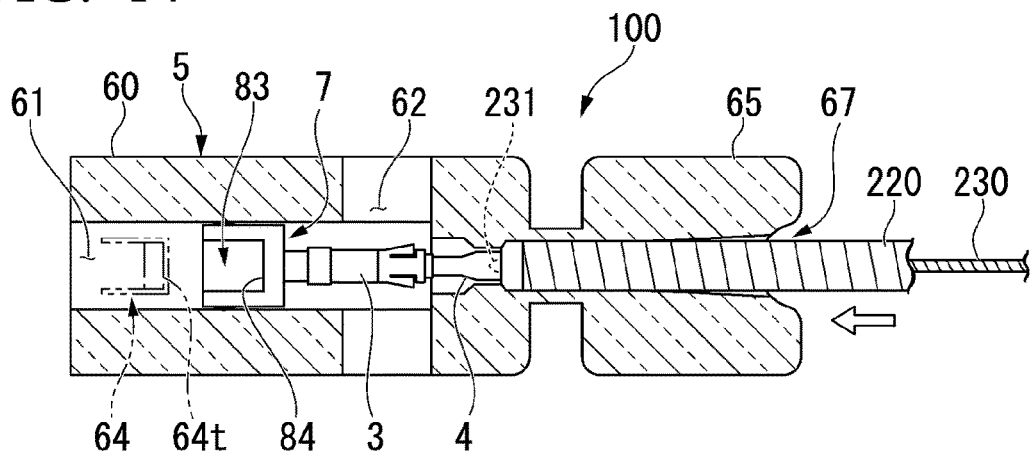
FIG. 14 is a description view showing a method of loading the clip unit into the clip introduction device.

As shown in FIG. 14, the user inserts the sheath 220 of clip introduction device 200 into the accommodation region 6S of the case 6 from the proximal-end opening 67 of the sheath connection portion 66. The user squeezes the sheath 220 at the squeezing portion 65 to fix the sheath 220 with respect to the case 6.

Figure 15:
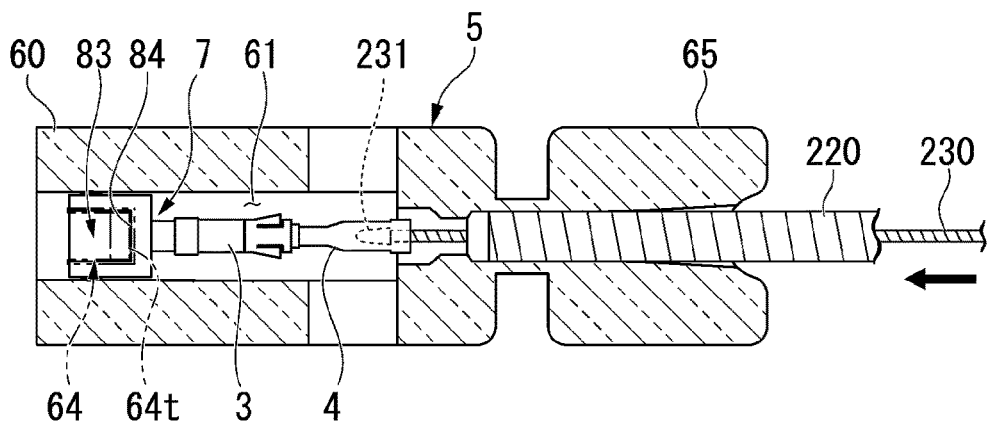
FIG. 15 is a description view showing the method of loading the clip unit into the clip introduction device.

As shown in FIG. 15, the user operates the operation portion 240 to advance the operation wire 230 with respect to the sheath 220 so as to advance the arrowhead hook portion 231. The arrowhead hook portion 231 advances the connection member 4 such that the regulating member 7 and the clip unit 1 advance. The regulating member 7 moves from the proximal-end side toward the distal-end side such that the looking surface 84 of the regulating member 7 abuts to the locking surface 64*t* of the locking portion 64 and engages therewith. As a result, the clip unit 1 does not advance further to the distal-end side at that position. In other words, the locking portion 64 regulates the pass-through of the clip unit 1 moving toward the distal-end side. The advancing arrowhead hook portion 231 is clamped by the elastic arm portion 44 of the connection member 4 of the clip unit 1 to be connected to the connection member 4.

The locking surface 84 of the regulating member 7 is formed as a plane approximately orthogonal to the central axis O3. Also, the locking surface 64*t* of the locking portion 64 is formed as a plane approximately orthogonal to the central axis O2. Accordingly, it is difficult for the regulating member 7 moving from the proximal-end side toward the distal-end side to push the locking portion 64 onto the one side (upper side) in the height direction H. Also, even in the case in which the locking surface 84 of the regulating member 7 is abutted to and engaged with the locking surface 64*t* of the locking portion 64, it is difficult for the central axis O1 of the clip unit 1 to be shifted from the central axis O2 of the accommodation region 6S.

Also, in the case in which the regulating member 7 does not have the engagement concave portion 83, the regulating member 7 moves from the proximal-end side to the distal-end side so as to be abutted to and engaged with the locking surface 64*t* of the locking portion 64. As a result, similar to the above-described situation, the advancing arrowhead hook portion 231 is connected to the connection member 4.

Figure 16:
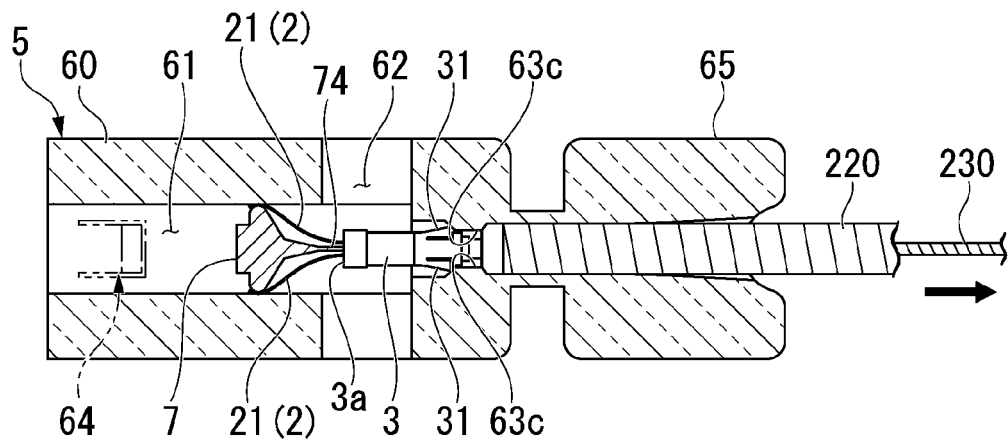
FIG. 16 is a description view showing the method of loading the clip unit into the clip introduction device.

As shown in FIG. 16, the user pulls the operation wire 230. The clip 2 of the clip unit 1 is pulled to the proximal-end side by the connection member 4 that is connected with the arrowhead hook portion 231. The hook 41f of the connection member 4 pulls the connection portion 22 of the clip 2 without being broken. The regulating member 7 moves the first region 61 of the accommodation region 68 in the state of being contact with the pair of arms 21. The pair of arms 21 having the self-expanding force engages with the edge of the distal-end opening 3a of the pressing tube 3 such that the pressing tube 3 is also pulled to the proximal-end side together with the clip 2.

In the first region 61, the pair of arms 21 come into contact with the case main body 60 in the open-close direction P. Due to the friction force generated when the pair of arms 21 come into contact with the case main body 60, the clip 2 is retracted into the inside space of the pressing tube 3 so as to suitably prevent the clip 2 from being locked to the closed state by the pressing tube 3.

When the clip 2 is pulled toward the proximal-end side, the pressing portion 74 of the regulating member 7 engages with the edge of the distal end opening 3a of the pressing tube 3 so as to regulate the minimum approaching distance between the clip 2 and the pressing tube 3. The pressing portion 74 abuts to the pressing tube 3 in the state of being in contact with the pair of arms 21 due to the pulling of the operation wire 230 so as to regulate the relative movement of the regulating member 7 with respect to the pressing tube 3. Accordingly, it is possible to suitably prevent the clip 2 pulled to the proximal-end side by the connection member 4 from being retracted to the inside space of the pressing tube 3 and being locked to the closed state by the pressing tube 3.

Figure 17:
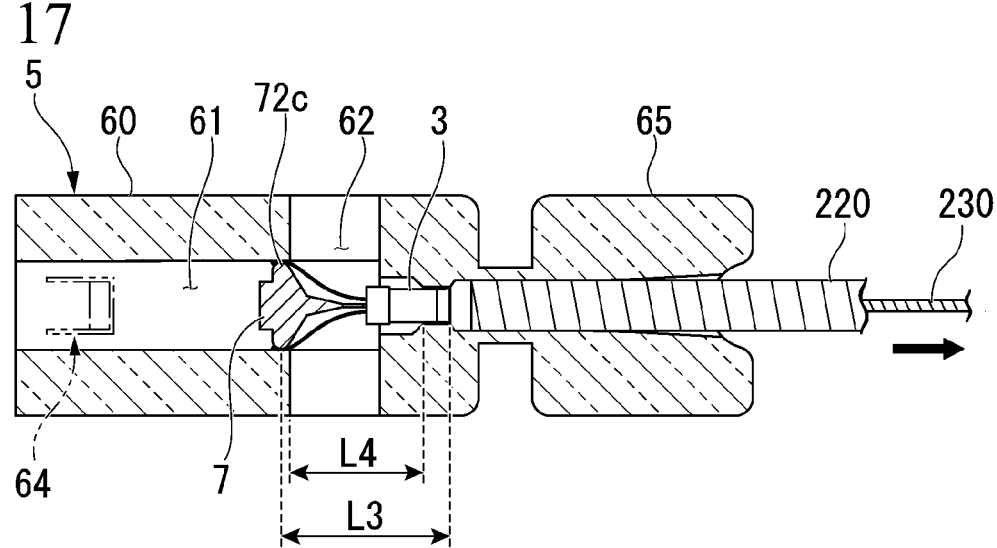
FIG. 17 is a description view showing the method of loading the clip unit into the clip introduction device.

The user further pulls the clip unit 1 to the proximal-end side. As shown in FIG. 17, the pressing tube 3 passes through the folding portion 63. The pressing tube 3 slides the dimeter-reducing portion 63c from the distal end side toward the proximal-end side such that the protruding-recessing wings 31 of the pressing tube 3 are accommodated inside the pressing tube main body 30. The pressing tube 3 in which the pressing recessing wings 31 are accommodated inside thereof is retracted in the sheath 220.

As shown in FIG. 17, the length l3 in the direction of central axis O1 and central axis O3 from the contact point 72c to the distal ends of the protruding-recessing wings 31 is equal to or larger than the distance L4 from the distal end of the second region 62 to the proximal end of the tapered portion 63b. Accordingly, when the protruding-recessing wings 31 of the pressing tube 3 are accommodated inside the pressing tube 3, the contact point 72c of the pair of arms 21 and the case main body 60 is positioned in the first region 61. In other words, until the protruding-recessing wings 31 are accommodated inside the pressing tube 3, the pair of arms 21 are grasping the regulating member 7 and are not retracted into the inside space of the pressing tube 3.

Figure 18:
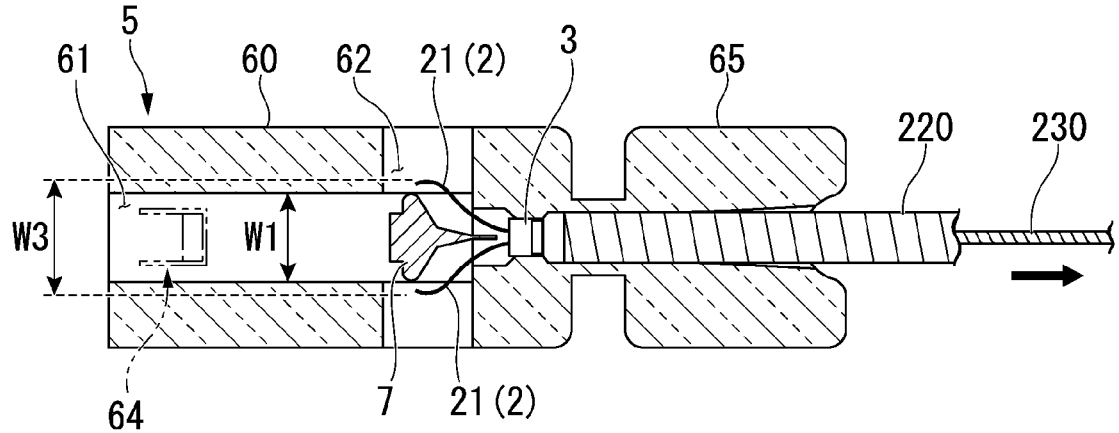
FIG. 18 is a description view showing the method of loading the clip unit into the clip introduction device.

As shown in FIG. 18, the user further pulls the operation wire 230 to pull the regulating member 7 until the second region 62. The length W2 of the second region in the width direction W is larger than the open width W3 of the pair of arms in the open state. Accordingly, in the second region 62, the regulating member 7 is not grasped by the pair of arms 21.

Figure 19:
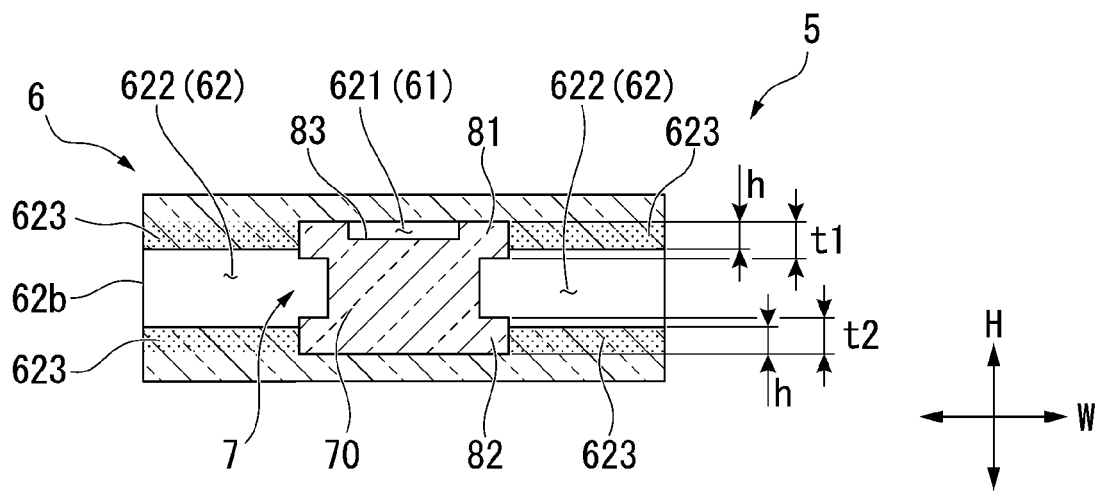
FIG. 19 is a description view showing the method of loading the clip unit into the clip introduction device.

FIG. 19 is a cross-sectional view showing the regulating member 7 that is arranged in the second region 62 of the case 6.

The second region 62 includes a central region 621 through which the regulating member 7 passes and a lateral region 622 sandwiching the central region 621 from the two side in the width direction W. The lateral region 622 communicates with the opening 62b.

The central region 621 is a region through which the regulating member 7 passes along the longitudinal direction L. The Lengths of the central region 621 in the width direction W and the height direction H are slightly larger than the lengths of the regulating member 7 in the width direction W and the height direction H respectively. Accordingly, the regulating member 7 can smoothly pass through the central region 621.

The lateral region 622 is a region through which the pair of arms 21 in the open state can pass. The length of the lateral region 622 in the height direction H is larger than the length of the pair of arms 21 in the height direction H. Also, the length of the lateral region 622 in the height direction H is smaller than the length of the central region 621 in the height direction H.

At the two sides of the lateral region 622 in the height direction H, the guide portion 623 protruding in the height direction H is formed. The thickness h of the guide portion 623 in the height direction H is shorter than the thickness t1 of the upper-layer auxiliary member 81 in the height direction H and the thickness t2 of the lower-layer auxiliary member 82 in the height direction H. Accordingly, in the second region 62, the pair of arms 21 in the open state are not caught by the guide portion 623. Also, the regulating member 7 straightly passes through the central region 621 along the guide portion 623.

Figure 20:
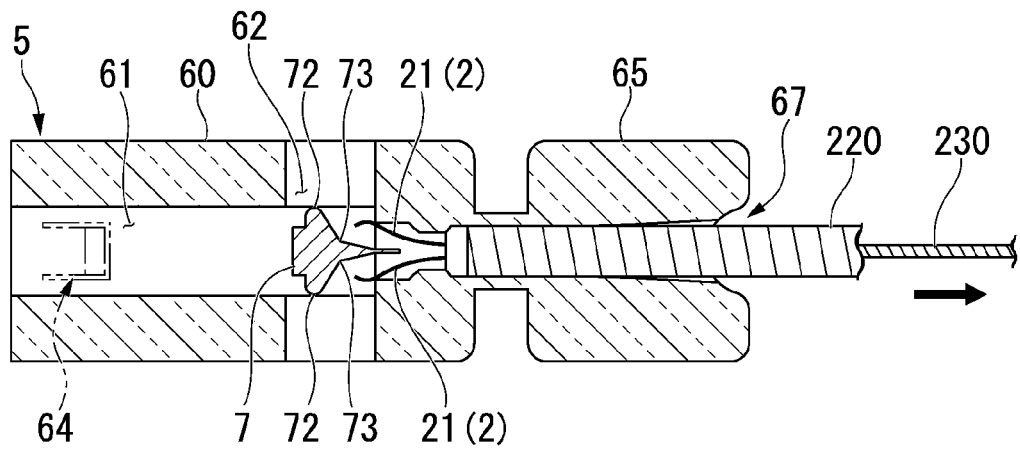
FIG. 20 is a description view showing the method of loading the clip unit into the clip introduction device.

As shown in FIG. 20, the user further pulls the operation wire 230. The clip 2 is separated from the regulating member 7 to be pulled to the proximal-end side. In the regulating member 7, the tapered portion 73 is formed at the proximal-end side of the protruding portion 72 that is grasped by the pair of arms 21. Accordingly, when the regulating member 7 is pulled toward the proximal-end side, it is difficult for the pair of arms 21 to be caught by the regulating member 7.

Figure 21:
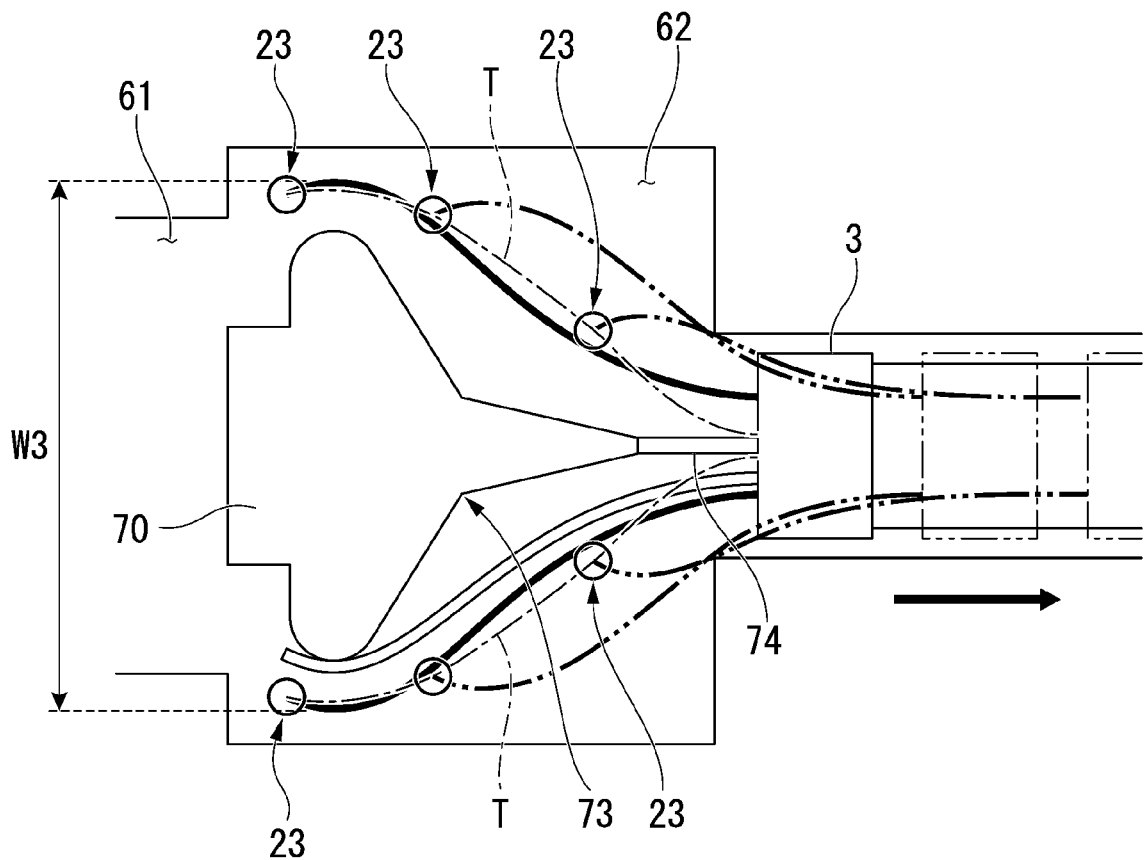
FIG. 21 is a view showing a shape of the regulating member that is difficult to be pinched by the clip.

FIG. 21 is a view showing the shape of the regulating member 7 being difficult to be caught by the clip 2.

When the regulating member 7 is pulled to the second region 62, the pair of arms 21 do not grasp the regulating member 7 and expand to the open width W3 in the open state. The proximal-end side of the protruding portion 72 of the regulating member 7 is formed in the shape that is difficult to interfere with the trajectory T of the tissue grasping portion 23 when the clip 2 is pulled. Accordingly, when the regulating member 7 is further pulled toward the proximal-end side, it is difficult for the pair of arms 21 to be caught by the regulating member 7.

Figure 22:
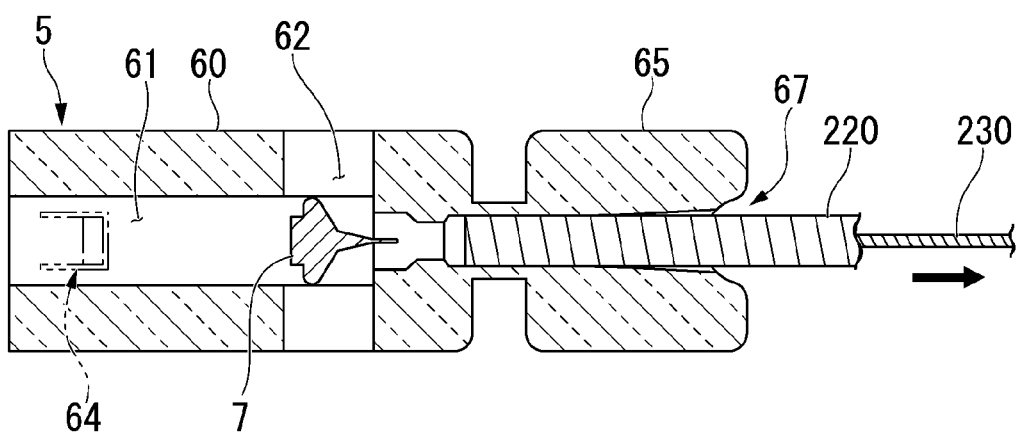
FIG. 22 is a description view showing the method of loading the clip unit into the clip introduction device.

As shown in FIG. 22, the user further pulls the operation wire 230. The pair of arms 21 do not grasp the regulating member 7 such that the minimum approaching distance between the clip 2 and the pressing tube 3 is not regulated. The clip 2 that is pulled toward the proximal-end side is retracted in the inside space of the pressing tube 3 while being retracted in the sheath 220. The clip 2 may be retracted in the sheath 220 without being retracted in the inside space of the pressing tube 3. Accordingly, the loading of the clip unit 1 into the clip introduction device 200 is finished. The user releases the squeezing by the squeezing portion 65 with respect to the sheath 220 to withdraw the sheath 220 from the case 6.

[Method of Accommodating Clip Unit 1]

Next, a method of accommodating the clip unit 1 into the cartridge 5 will be described. FIG. 23 to FIG. 26 are views showing the method of accommodating the clip unit 1 into the cartridge 5.

Figure 23:
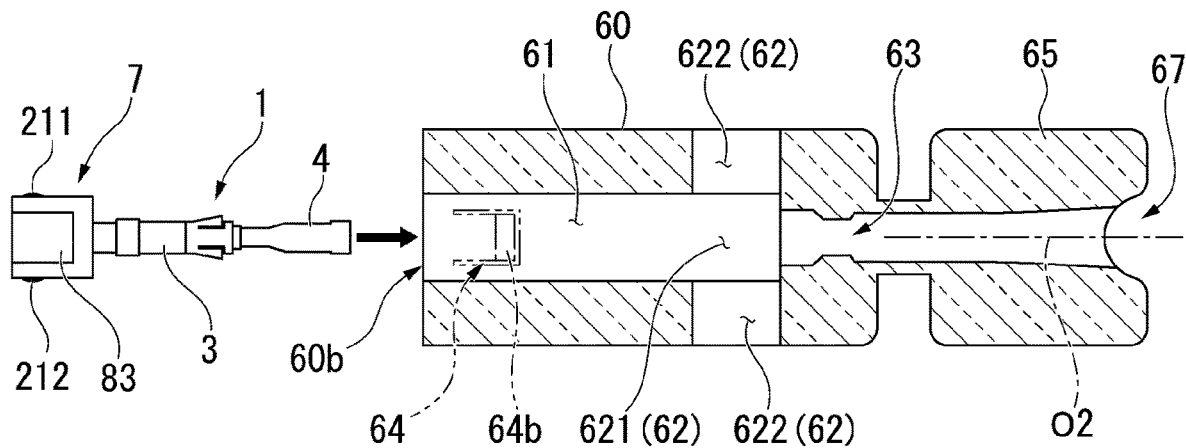
FIG. 23 is a description view showing a method of accommodating the clip unit in the cartridge.

As shown in FIG. 23, the user closes the pair of arms 21 by the hands or the like to grasp the regulating member 7 by the pair of arms 21. Next, the user inserts clip unit 1 grasping the regulating member 7 into the accommodation region 6S of the cartridge 5 from the distal-end opening 60b.

Figure 24:
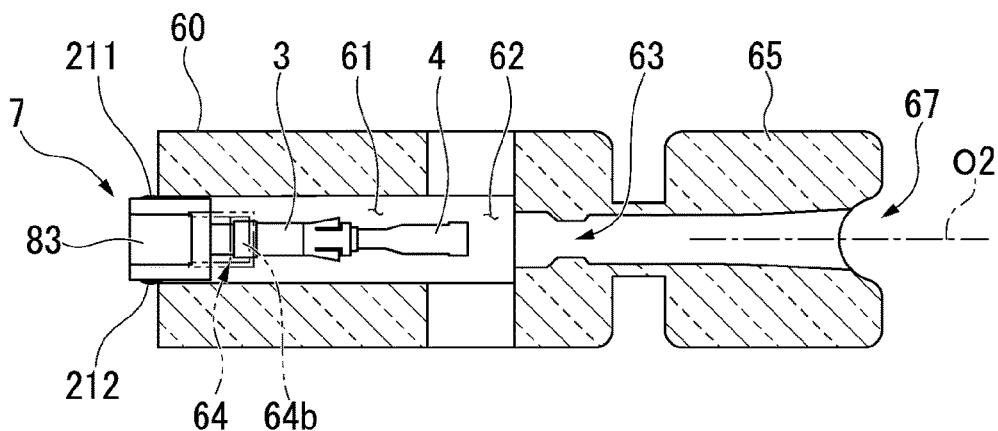
FIG. 24 is a description view showing the method of accommodating the clip unit in the cartridge.

As shown in FIG. 24, the user presses the regulating member 7 to the proximal-end side to move the clip unit 1 to the proximal end side. The length W1 of the first region 61 in the width direction W is smaller than the open width W3 of the pair of arms 21 in the open state. Accordingly, when the pair of arms 21 grasping the regulating member 7 are inserted into the first region 61, the first arm 211 comes into contact with the end portion of the distal-end opening 60b at one side in the width direction W, and the second arm 212 comes into contact with the end portion of the distal-end opening 60b at the other side in the width direction W. The user further presses the regulating member 7 to the proximal-end side such that the pair of arms 21 being in contact with the distal-end opening 60b further enters the closed state and inserted into the first region 61.

Figure 25:
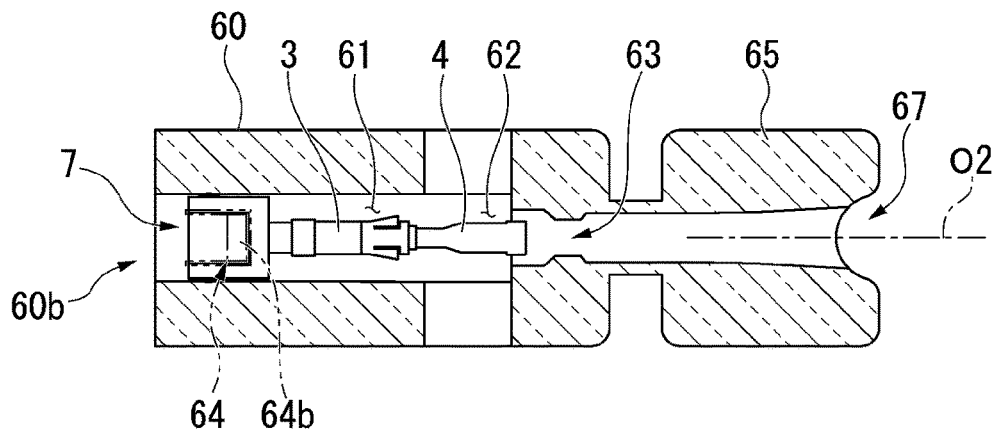
FIG. 25 is a description view showing the method of accommodating the clip unit in the cartridge.

As shown in FIG. 25, when the regulating member 7 moves the vicinity of the locking portion 64 of the case 6 from the distal-end side toward the proximal-end side, the regulating member 7 presses the locking portion 64 toward the one side (upper side) in the height direction H to cause the locking portion 64 to pass therethrough. As shown in FIG. 8, the locking portion 64 is elastically deformed as the cantilever beam with the end portion 64c at the distal-end side in the longitudinal direction L as the fixing end and the end portion 64d at the proximal-end side in the longitudinal direction L as the free end. Accordingly, it is easy for the regulating member 7 moving from the distal-end side to the proximal-end side to press and make the locking portion 64 to be elastically deformed.

As shown in FIG. 8, the inclination surface 64s is formed in the distal-end side in the longitudinal direction L of the locking convex portion 64b. At the time when the regulating member 7 moving from the distal-end side toward the proximal-end side comes into contact with the locking convex portion 64b of the locking portion 64, the regulating member 7 comes into contact with the inclination surface 64s. Accordingly, it is easy for the regulating member 7 moving from the distal-end side to the proximal-end side to press the locking portion 64 to the one side (upper side) in the height direction H.

Even in the case in which the regulating member 7 does not have the engagement concave portion 83, it is possible for the regulating member 7 to press the locking portion 64 to the one side (upper side) in the height direction H so as to pass therethrough by the regulating member 7 moving from the distal-end side to the proximal-end side. However, the regulating member 7 has the engagement concave portion 83 such that the distance for the regulating member 7 to pass through while pressing the locking portion 64 to the upper side is short and facilitates the operations by the user.

Figure 26:
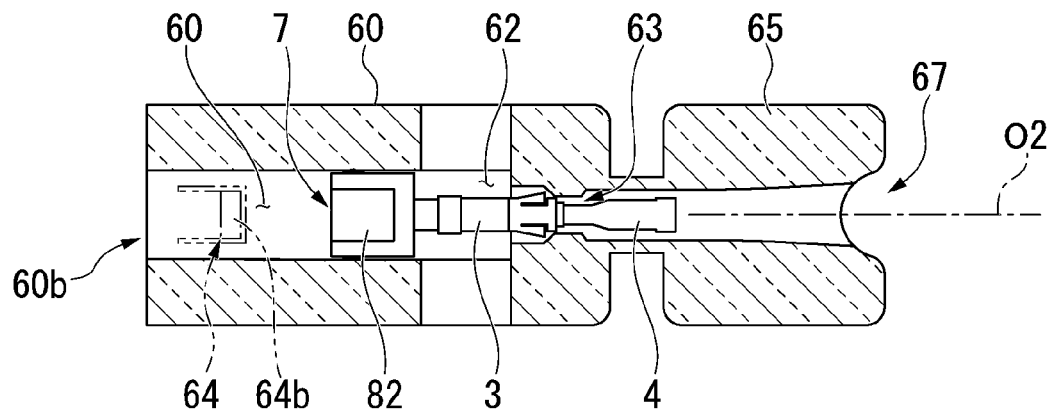
FIG. 26 is a description view showing the method of accommodating the clip unit in the cartridge.

As shown in FIG. 26, after the regulating member 7 passes through the vicinity of locking portion 64 of the case 6, the locking portion 64 returns to the initial state.

Figure 27:
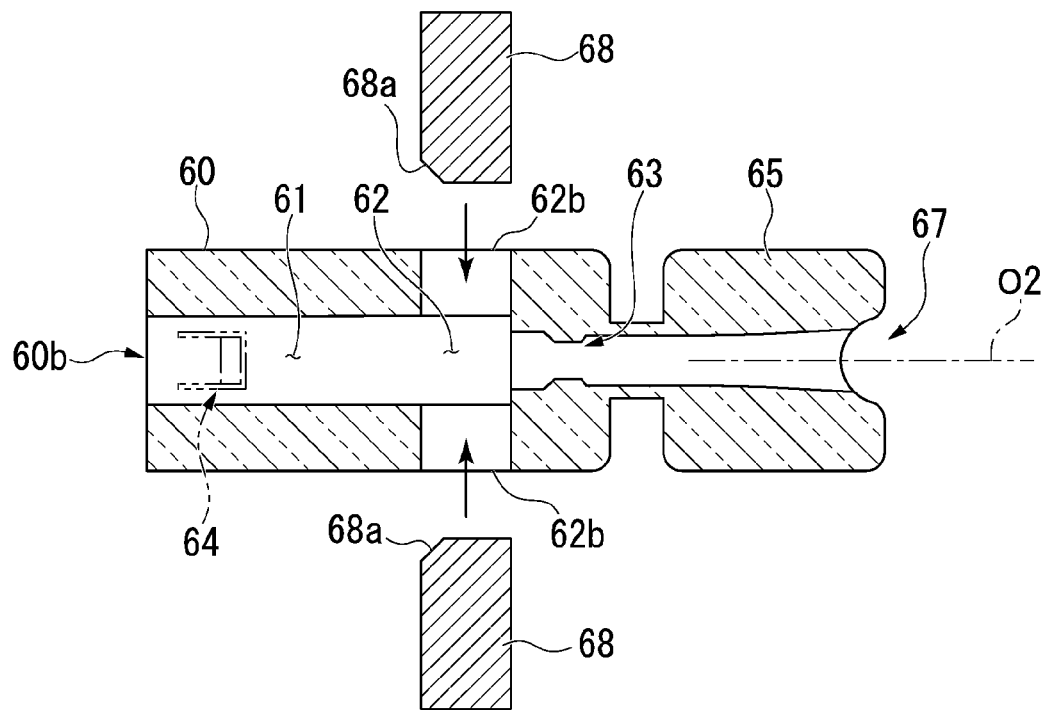
FIG. 27 is a description view showing the method of accommodating the clip unit by using a jig.
Figure 28:
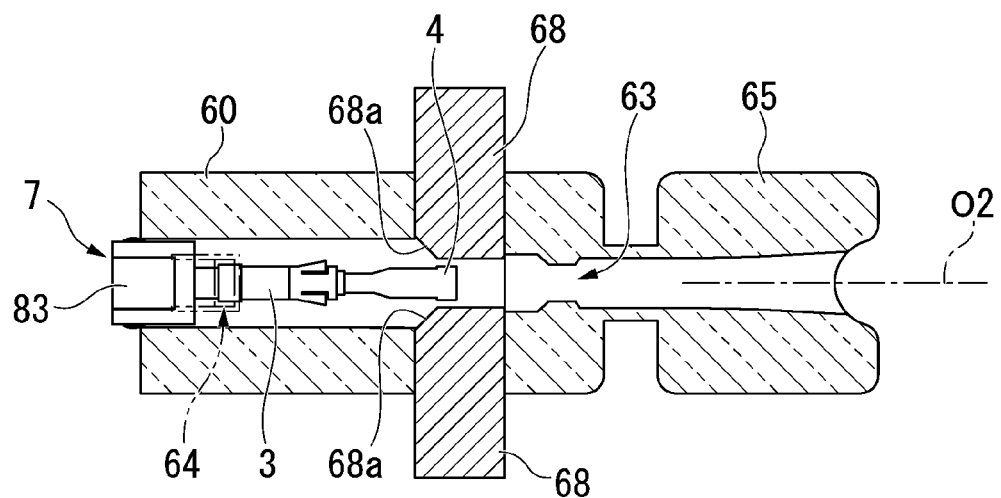
FIG. 28 is a description view showing the method of accommodating the clip unit by using a jig.
Figure 29:
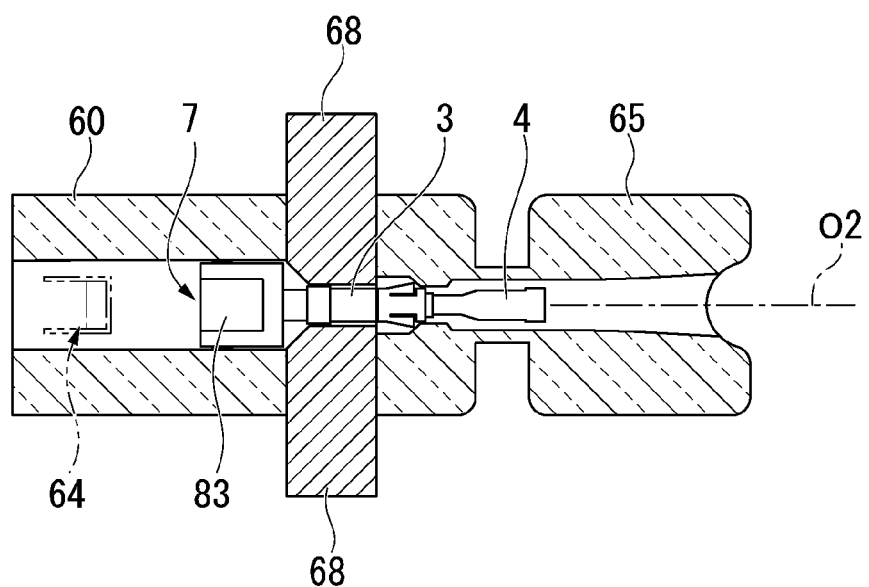
FIG. 29 is a description view showing the method of accommodating the clip unit by using a jig.

The case 6 of the cartridge 5 may further include a jig 68 for introducing the clip unit 1. FIG. 27 to FIG. 29 are views showing the method of using the jig 68 to accommodate the clip unit 1 in the cartridge 5.

As shown in FIG. 27, the jig 68 is insertable into the second region 62 from the openings 62b formed at the two sides of the second region 62 in the width direction W. The jig 68 includes the inclination surface 68a in the portion being in contact with the clip unit 1. The inclination surface 68a of the jig 68 that is inserted into the second region 62 is inclined with respect to the central axis O2 and the normal line of the inclination surface 68a is directed to the distal-end side.

As shown in FIG. 28, at the time of moving the clip unit 1 that is inserted into the accommodation region 6S to the proximal-end side, the user inserts the jig 68 into the second region 62. The clip unit 1 moving from the distal-end side toward the proximal-end side is guided by the inclination surface 68a of the jig 68 to be able to move horizontally with respect to the central axis O2. As a result, it is possible to straightly accommodate the clip unit 1 in the cartridge 5.

According to the cartridge system 100 according to the present embodiment, it is easy to load the clip unit 1 into the clip introduction device 2 without the clip 2 having the self-expanding force being locked to the closed state by the pressing tube 3.

According to the cartridge system 100 disclosed in the present embodiment, even if the distal-end opening 60b of the cartridge 5 into which the clip unit 1 is inserted is not closed by a lid or the like, it is possible to load the clip unit 1 into the clip introduction device 200 by regulating the passage of the regulating member 7 and the clip unit 1 moving to the distal-end side by the locking portion 64. On the other hand, the locking portion 64 allows the regulating member 7 and the clip unit 1 moving to the distal-end side to pass therethrough such that it is easy to insert the clip unit 1 into the cartridge 5.

As mentioned above, the first embodiment of the present disclosure is described by referring to figures, the specific configuration is not limited to the present embodiment, and the design changes within the scope not departing from the spirit of the present disclosure are also included. Also, the configuration elements in the above-described embodiment and the modification examples shown below can be appropriately combined.

Modification Example 1-1

Figure 30:
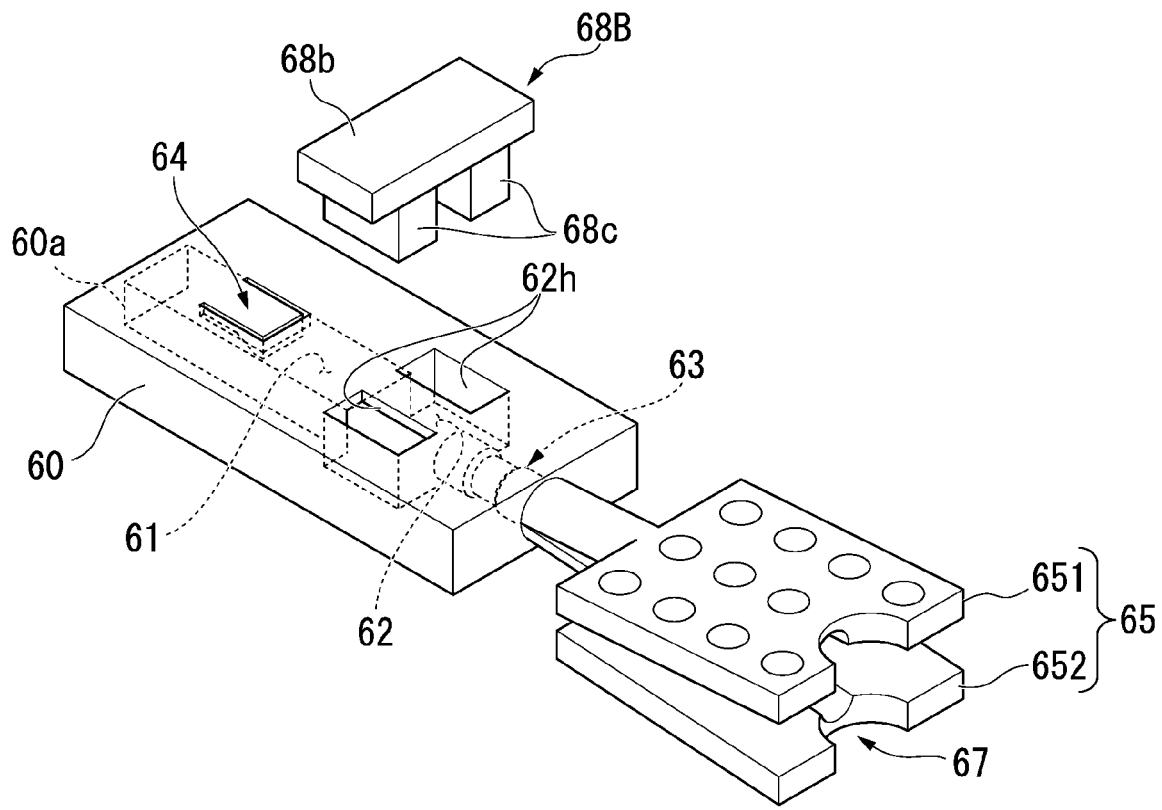
FIG. 30 is a view showing a modification example of the jig.

For example, in the above-described embodiment, the clip unit 1 is guided by using the jig 68. However, the aspect of guiding the clip unit 1 is not limited thereto. FIG. 30 is a view showing a jig 68B as a modification example of the jig 68. The jig 68B includes a jig main body 68b formed in a flat plate shape and a pair of guide members 68c. The pair of guide members 68c are provided in the jig main body 68b and extend from the jig main body 68b in the same direction with each other. In the case of using the jig 68B, the case main body 60 includes penetration holes 62h through which the pair of guide members 68c pass through instead of the opening 62b. The penetration holes 62h communicate with the second region 62.

Figure 31:
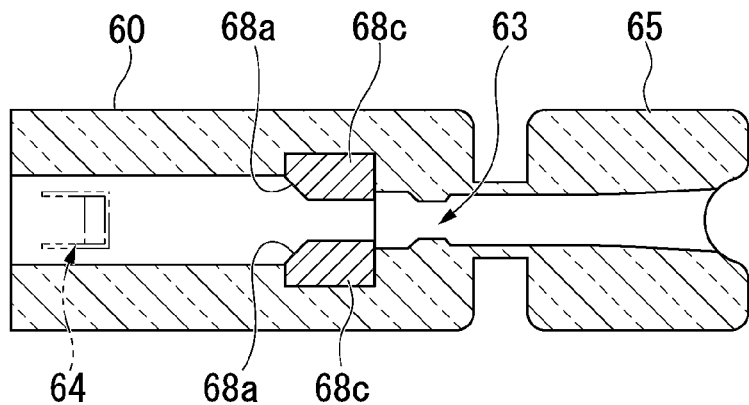
FIG. 31 is a cross-sectional view showing a cartridge to which the modification example of the jig is attached.
Figure 32:
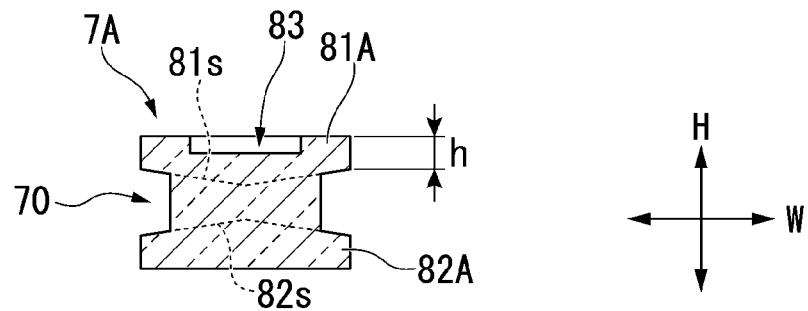
FIG. 32 is a cross-sectional view showing a modification example of the regulating member.

FIG. 31 is a cross-sectional view showing the cartridge 5 to which the jig 68B is attached.

The pair of guide members 68c pass through the penetration holes 62h to be inserted into the second region 62 respectively. Similar to the jig 68, the pair of guide members 68c guide the clip unit 1 moving from the distal-end side to the proximal-end side. Similar to the jig 68, the inclination surfaces 68a are formed in the pair of guide members 68c.

Modification Example 1-2

For example, according to the above-described embodiment, the upper-layer auxiliary member 81 and the lower layer auxiliary member 82 of the regulating member 7 are formed in the approximately flat plate shape. However, the shape of the regulating member 7 is not limited thereto. FIG.

32 is a cross-sectional view showing a regulating member 7A as the modification example of the regulating member 7. The regulating member 7A includes the middle-layer member 70, an upper-layer auxiliary member 81A as the modification example of the upper layer auxiliary member 81, and a lower-layer auxiliary member 82A as the modification example of the lower-layer auxiliary member 82.

In the front view viewed from the longitudinal direction L, a tapered surface 81s whose center in the width direction W protrudes is formed at the lower-layer auxiliary member 82A side of the upper-layer auxiliary member 81A. Also, a tapered surface 82s whose center in the width direction W protrudes is formed at the upper-layer auxiliary member 81A side of the lower-layer auxiliary member 82A.

Figure 33:
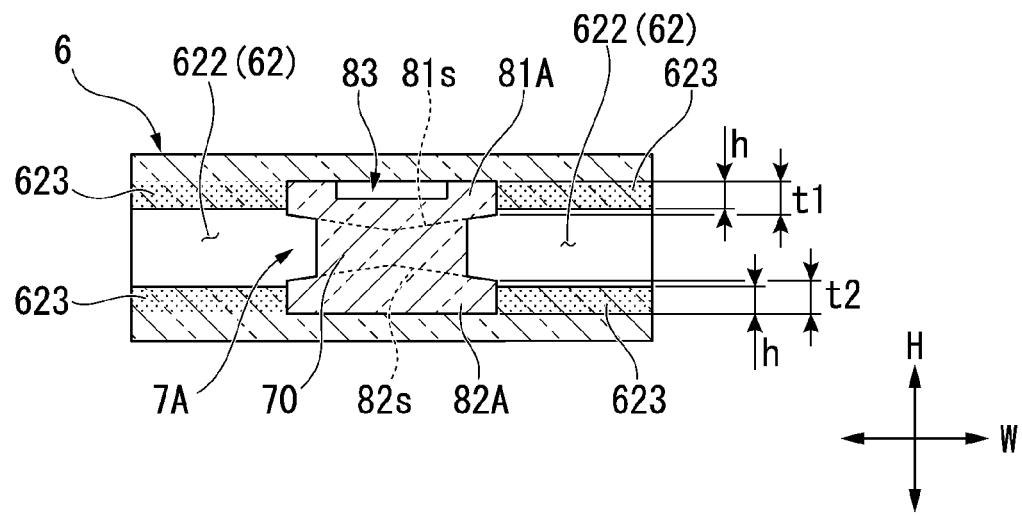
FIG. 33 is a cross-sectional view showing a modification example of the regulating member that is disposed in a second region of the case.

FIG. 33 is a cross-sectional view showing the regulating member 7A that is disposed in the second region of the case 6.

The tapered surface 81s and the tapered surface 82s are formed in the upper layer auxiliary member 81A and the lower-layer auxiliary member 82A respectively such that it is easy for the pair of arms 21 to open without being caught.

The thickness h of the guide portion 623 in the height direction H is shorter than the thickness t1 in the height direction H in the end portion of the upper-layer auxiliary member 81A in the width direction W and the thickness t2 in the height direction H in the end portion of the lower-layer auxiliary member 82A in the width direction W.

Accordingly, the pair of arms 21 in the open state are not caught by the guide portion 623 in the second region 62.

Modification Example 1-3

Figure 34:
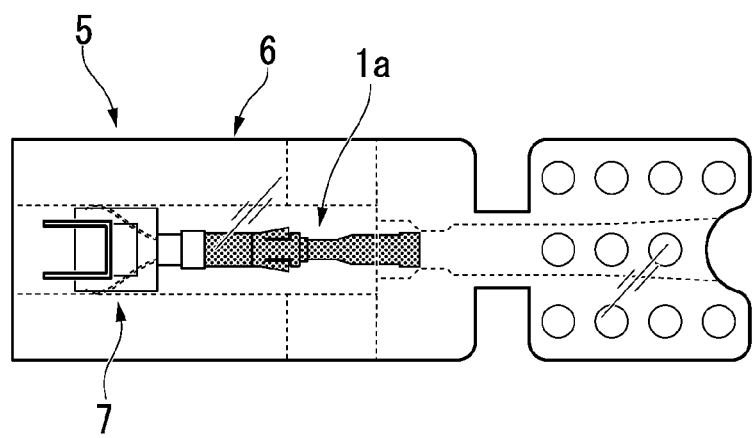
FIG. 34 is a view showing the cartridge that accommodates another clip unit.
Figure 35:
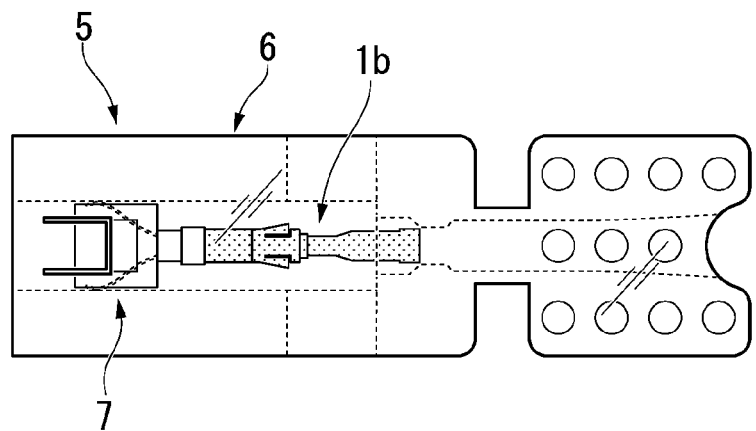
FIG. 35 is a view showing the cartridge that accommodates another clip unit.

For example, according to the above-described embodiment, the clip unit 1 is accommodated in the cartridge 5. However, different types of the clip units may be accommodated in the cartridge 5. FIG. 34 is a view showing the cartridge 5 accommodating a clip unit 1a. FIG. 35 is a view showing the cartridge 5 accommodating a clip unit 1b. Compared with the clip unit 1, the clip unit 1a and the clip unit 1b are different from each other in the shape of the pair of arms 21, for example.

The clip unit 1a and the clip unit 1b are applied with different colors. Also, the case 6 is formed from the transparent resin material. Accordingly, it is easy for the user to determine the type of the clip unit accommodated in the cartridge 5.

Figure 36:
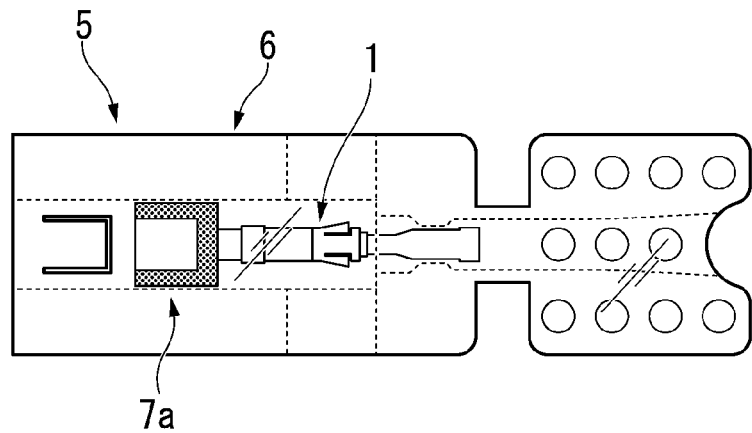
FIG. 36 is a view showing the cartridge that accommodates another regulating member.
Figure 37:
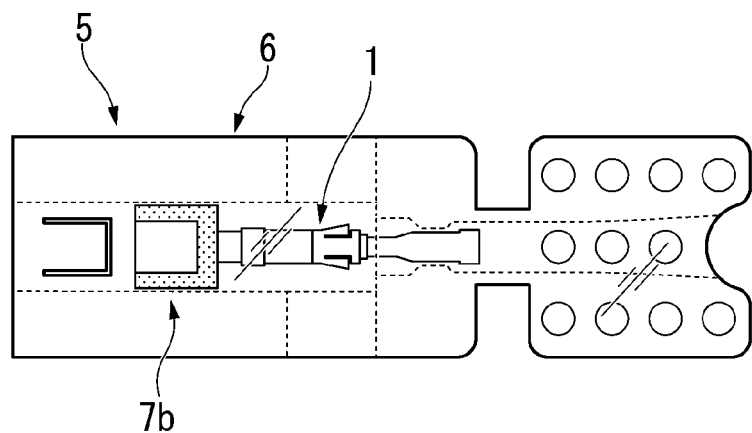
FIG. 37 is a view showing the cartridge that accommodates another regulating member.

FIG. 36 is a view showing the cartridge 5 accommodating the regulating member 7a. FIG. 37 is a view showing the cartridge 5 accommodating the regulating member 7b. Compared with the regulating member 7, the regulating member 7a and the regulating member 7b are applied with different colors. Similar to the regulating member 7a and the regulating member 7b, the regulating member 7 may be applied with different colors corresponding to the type of the clip unit. Even in this case, the case 6 is formed form the transparent resin material such that it is easy for the user to determine the type of the clip unit accommodated in the cartridge 5.

Figure 38:
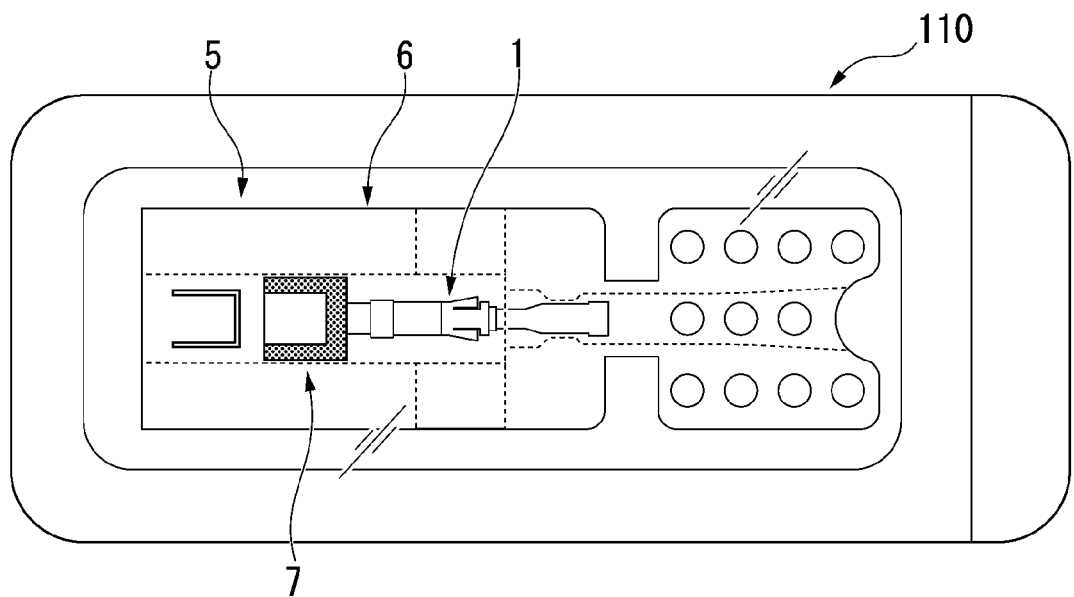
FIG. 38 is a view showing the cartridge that is packed in a pack.

FIG. 38 is a view showing the cartridge 5 that is packed in the pack 110.

The clip unit 1 shown in FIG. 38 is packed in the pack 110 in the state in which the cartridge 5 is accommodated. The pack 110 is formed by using the transparent resin material. Even in the state of being packed in the pack 110, the user can determine the type of the clip unit by applying different colors to the regulating member 7 corresponding to the type of the clip unit, similar to the regulating member 7a.

Second Embodiment

The second embodiment of the present disclosure will be described by referring to FIG. 39 to FIG. 46. In the following description, the configurations being common to the described configurations will be designated with the same reference sign and the duplicate description will be omitted. A cartridge system 100B according to the second embodiment is different from the cartridge system 100 according to the first embodiment in the configuration of cartridge 5.

Figure 39:
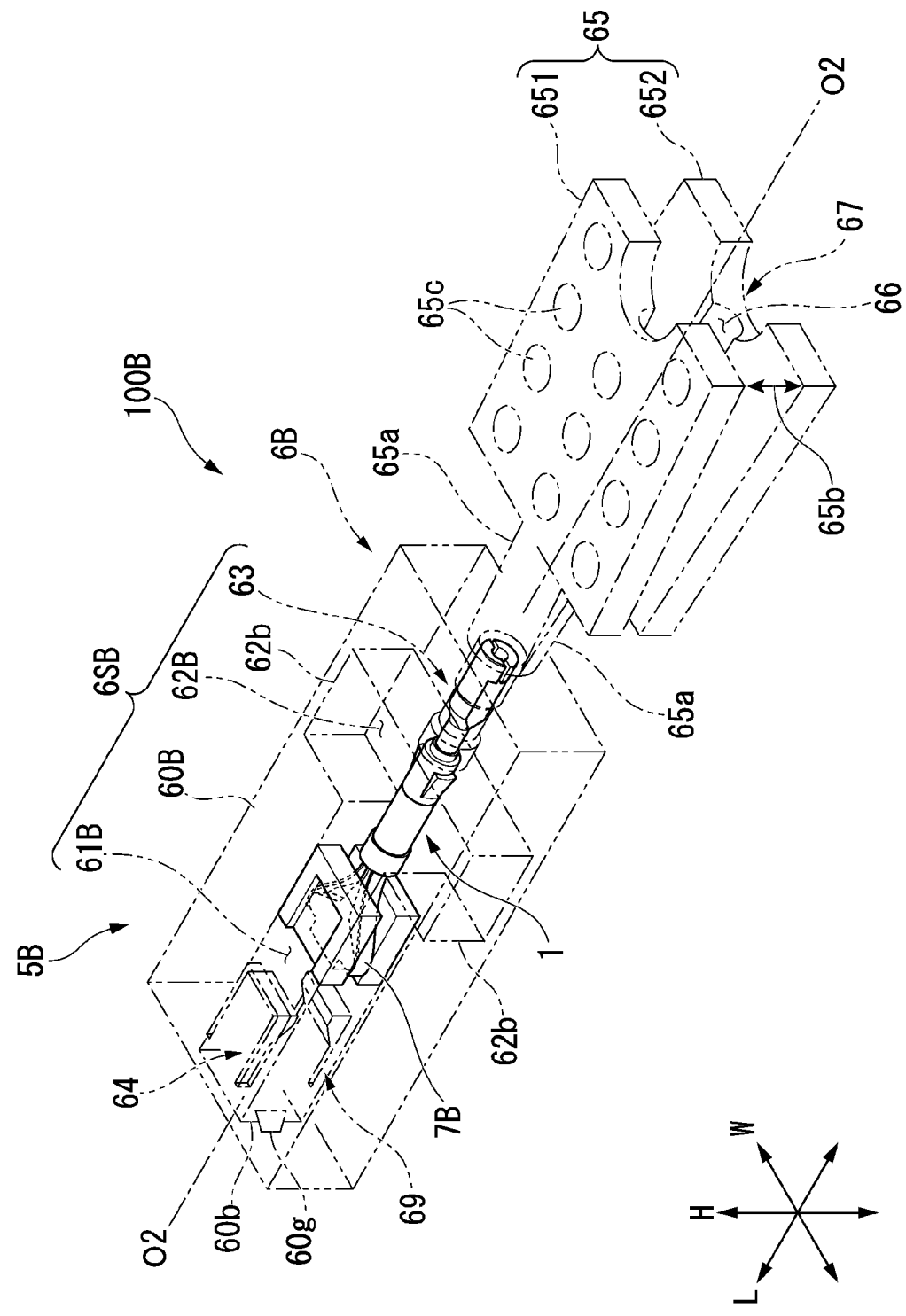
FIG. 39 is a perspective view showing a cartridge system according to a second embodiment.

FIG. 39 is a perspective view showing the cartridge system 100B.

The cartridge system 100B includes the clip unit 1 and the cartridge 5B accommodating the clip unit 1.

Figure 40:
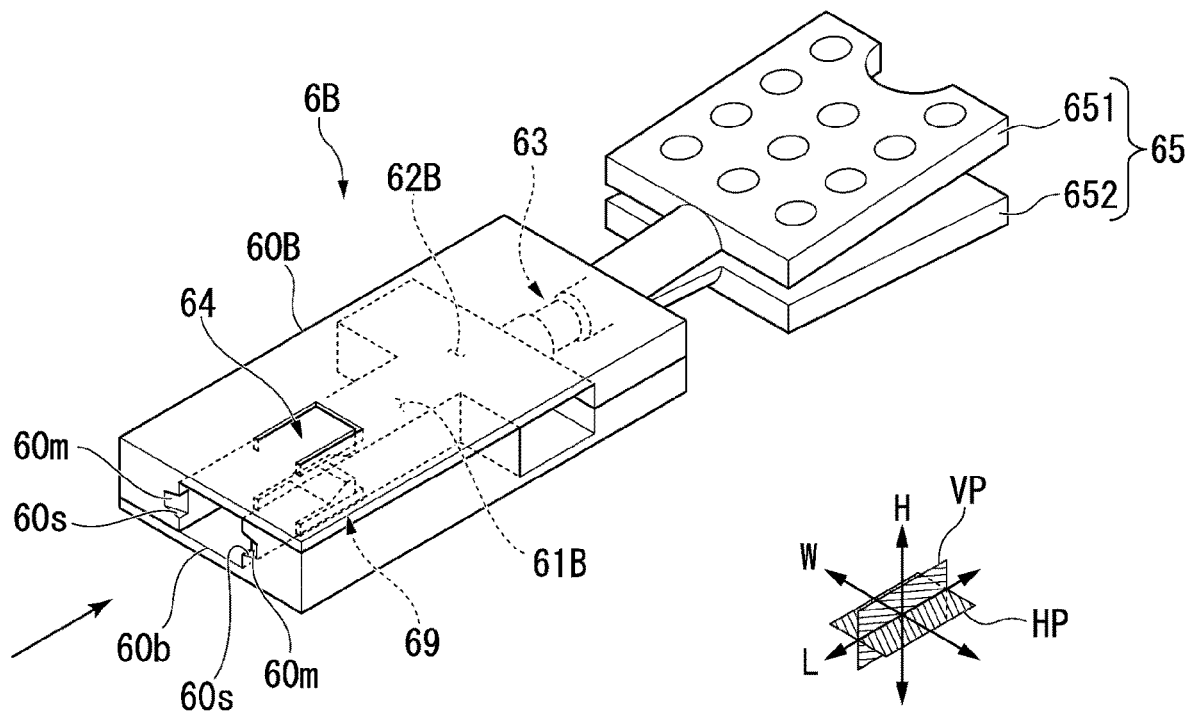
FIG. 40 is a perspective view showing a case of a cartridge of the cartridge system.

FIG. 40 is a perspective view showing the case 6B.

The cartridge 5B includes the case 6B and the regulating member 7B. The length of the cartridge 5B in the longitudinal direction L is about 50 mm, the width thereof is about 10 mm to 20 mm, and the thickness thereof is about 5 mm such that the cartridge 5B is formed in the dimension to be easily grasped by hands.

Similar to the first embodiment, the two directions being orthogonal to the longitudinal direction L of the cartridge 5B while being orthogonal to each other are defined as the "width direction w" and the "height direction H". The plane being horizontal to the longitudinal direction L and the width direction W is defined as the "horizontal plane HP". The plane being horizontal to the longitudinal direction L and the height direction H is defined as the "vertical plane VP". In the cartridge 5B accommodating the clip unit 1, the side of the pair of arms 21 is defined as the distal-end side of the cartridge 5B, and the side of the connection member 4 is defined as the proximal-end side of the cartridge 5B.

The case 6B includes a case main body 60B, the squeezing portion 65, and the sheath connection portion 66. The case 6B is formed from the same material and by the same method with that of the case 6 according to the first embodiment.

The case main body 60B is formed in the rectangular box shape. The length of the case main body 60B in the width direction W is longer than the length of the case main body 60B in the height direction H.

An accommodation region 6SB for accommodating the clip unit 1 to be movable in the longitudinal direction L is formed in the case main body 60B. The accommodation region 6SB includes a first region 61B, a second region 62B, and the folding portion 63. The first region 61B, the second region 62B, and the folding portion 63 are arranged from the distal end toward the proximal end in this sequence in the longitudinal direction L. The first region 61B, the second region 62B, and the folding portion 63 are the inside space being symmetrically formed with respect to the vertical plane VP including the central axis O2 of the cartridge 5B in the longitudinal direction L.

Figure 41:
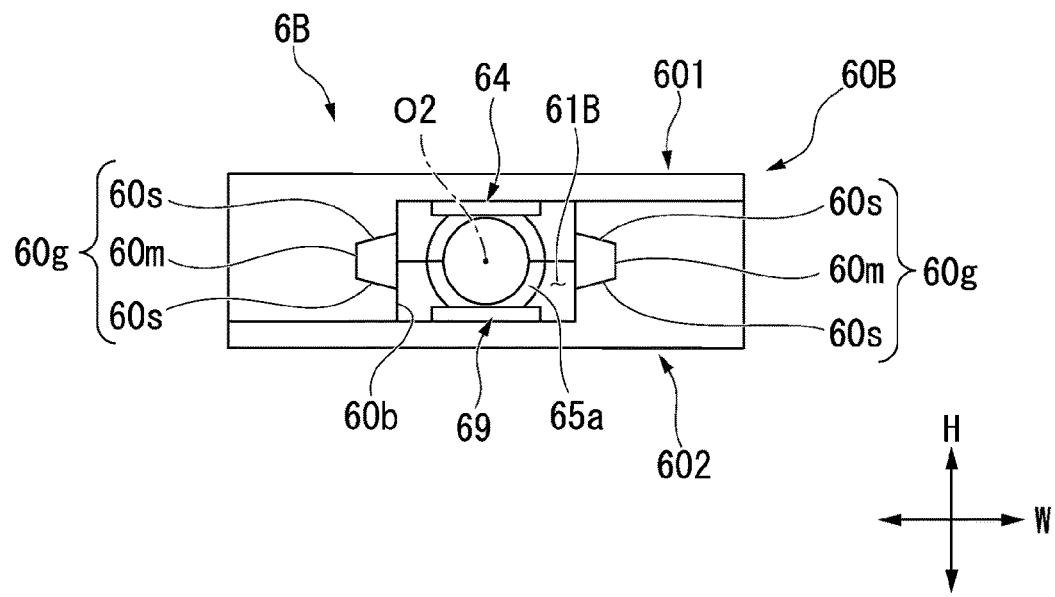
FIG. 41 is a front view showing the case when viewed in an arrowhead direction shown in FIG. 40.

FIG. 41 is a front view showing the case 6B viewed from the arrowhead direction shown in FIG. 40.

The clip unit 1 is accommodated in the accommodation region 6SB from the distal-end opening 60b formed at the distal-end side of the accommodation region 6SB of the case main body 60B. The guide grooves 60g formed in the concave portion are formed at two sides of the distal-end opening 60b in the width direction W.

The guide grooves 60g are concave grooves into which the pair of arms 21 can enter. The pair of arms 21 are smoothly inserted into the first region 61B along the guide grooves 60g. The guide groove 60g includes a guide surface 60m and two side surfaces 60s. The two side surfaces 60s are formed at the two sides of the guide surface 60m in the height direction H.

The guide surface 60m is the plane being inclined with the vertical plane VP. The normal line of the guide surface 60m is directed to the distal end side in the longitudinal direction L. The guide surface 60m is the surface for guiding the pair of arms 21 inserted into the first region 61B to gradually enter the closed state.

The side surfaces 60s are planes being inclined with the horizontal plane HP. As shown in FIG. 41, in the front view viewed from the longitudinal direction L, the two side surfaces 60s are formed in the tapered shape to widen as approaching the central axis O2. The side surfaces 60s are the surfaces for guiding the pair of arms 21 inserted into the first region 61B to be horizontal with respect to the horizontal plane HP.

The first region 61B is the inside space for accommodating the clip unit 1 to be movable in the longitudinal direction L. The first region 61B communicates with the second region 62B. The first region 61B includes the locking portion 64 and a second locking portion 69.

The second locking portion 69 is formed at the distal-end side of the first region 61B and at the other side (lower side) in the height direction H. The second locking portion 69 is formed in the same shape with that of the locking portion 64. The locking portion 64 and the second locking portion 69 are formed at symmetrical positions with respect to the central axis O2 of the accommodation region 6SB in the longitudinal direction L.

The second region 62B is the inside space to accommodate the clip unit 1 to be movable in the longitudinal direction L. The length of the second region 62B in the longitudinal direction L is shorter than the length of the first region 61B in the longitudinal direction. The second region 62B communicates with the folding portion 63. The second region 62B is the same with the second region 62 according to the first embodiment except for the point where the guide portion 623 is not provided.

Figure 42:
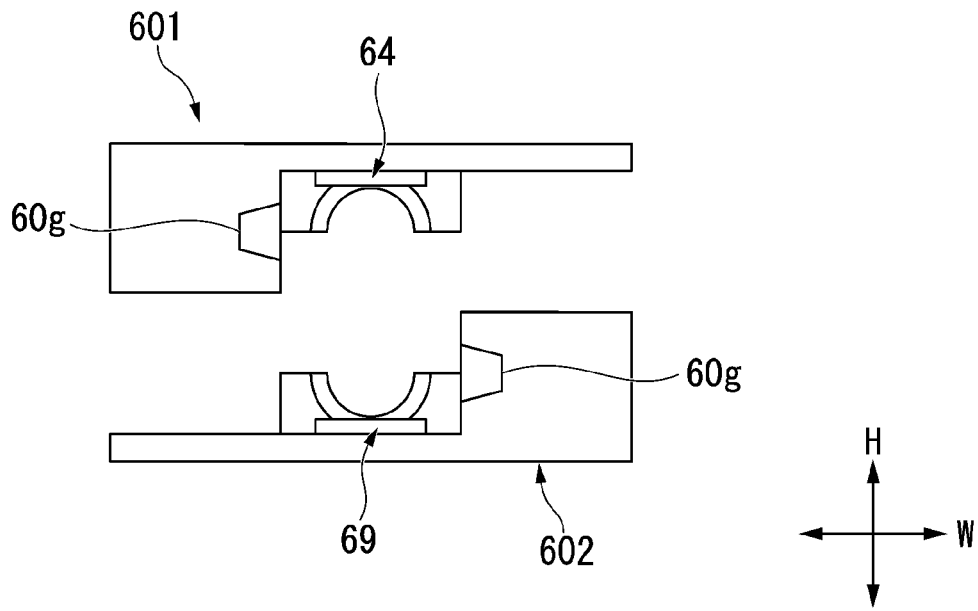
FIG. 42 is an exploded view showing a case main body of the case.

FIG. 42 is an exploded view showing the case main body 60B.

The case main body 60B is formed by the first case member 601 and the second case member 602 being adhered with each other. The first case member 601 and the second case member 602 are formed in the same shape. As shown in FIG. 41, the adhered first case member 601 and the second case member 602 are not symmetrical members with respect to the horizontal plane HP including the central axis; however, the adhered first case member 601 and the second case member 602 are symmetrical members with respect to the central axis O2.

The adhesion portion where the first case member 601 and the second case member 602 are adhered is generally formed with the convex portion and the concave portion. However, the adhesion portion is not formed in the portion to which the pair of arms 21 are in contact in the guide groove 60g and the first region 61B. Accordingly, the pair of arms 21 are smoothly inserted in to the first region 61B without being affected by the concave portion and the convex portion formed in the above-described adhesion portion.

Figure 43:
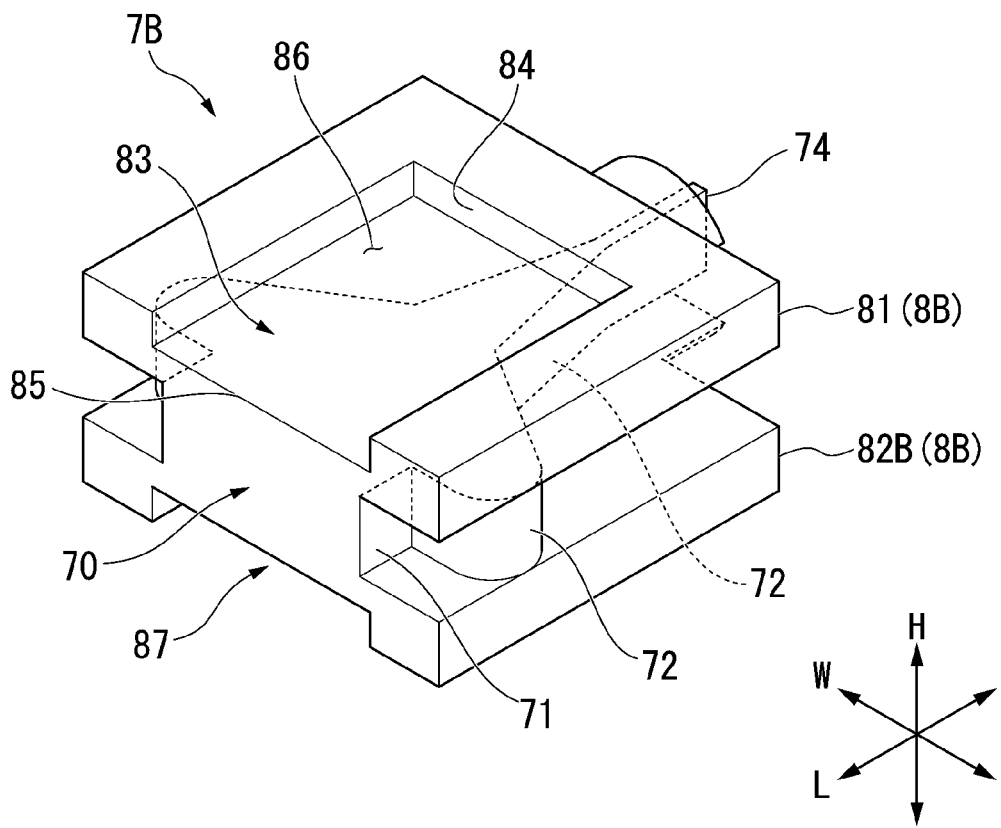
FIG. 43 is a perspective view showing a regulating member of the cartridge.

FIG. 43 is a perspective view showing the regulating member 7B.

The regulating member 7B is accommodated in the first region 61B and the second region 62B to be movable therein together with the clip unit 1. The regulating member 7B is formed in the symmetrical shape with respect to the vertical plane VP including the central axis O3 of the regulating member 7B in the longitudinal direction L. The regulating member 7 includes the middle layer member 70 and an auxiliary member 8B.

The auxiliary member 8B is configured to adjust the position of the regulating member 7 in the height direction H such that the protruding portion 72 is grasped by the pair of arms 21. The auxiliary member 8B includes the upper-layer auxiliary member 81 provided at the one side (upper side) in the height direction H and a lower layer auxiliary member 82B provided at the other side (lower side) in the height direction H. The middle-layer member 70 is sandwiched by the upper-layer auxiliary member 81 and the lower layer auxiliary member 82B in the height direction H. In the case in which there is unnecessary to adjust the position of the regulating member 7 in the height direction H, the auxiliary member 8B is not required.

A second engagement concave portion 87 is formed at the other side (lower side) in the height direction H in the lower layer auxiliary member 82B. The second engagement concave portion 87 is the concave portion for engaging with the second locking portion 69. The second engagement concave portion 87 is formed in the same shape with that of the engagement concave portion 83. The engagement concave portion 83 and the second engagement concave portion 87 are formed at the positions being symmetrical with respect to the central axis O3. In the case in which the auxiliary member 8 is not required, the second engagement concave portion 87 only has to be provided in at least part of the distal-end portion 71, the protruding portion 72, and the tapered portion 73.

[Method of Loading Clip Unit 1]

The method of loading the clip unit 1 is the same with that according to the first embodiment except for the point described below.

When the clip unit 1 is loaded in the clip introduction device 200 using the cartridge 5B, the engagement concave portion 83 of the regulating member 7B and the locking portion 64 are abutted to and engaged with each other. Also, the second engagement concave portion 87 of the regulating member 7B and the second locking portion 69 are abutted to and engaged with each other. As a result, it is impossible for the clip unit 1 to advance to the distal-end side from the position. That is, the locking portion 64 and the second locking portion 69 regulate the passage of the clip unit 1 moving to the distal-end side. The advancing arrowhead hook portion 231 is sandwiched by the elastic arm portion 44 of the connection member 4 of the clip unit 1 to be connected to the connection portion 4. The regulating member 7B is abutted to and engaged with the locking portion 64 and the second locking portion 69 such that the cartridge 53 more definitely regulates the passage of the clip unit 1 moving toward the distal-end side.

[Method of Accommodating Clip Unit 1]

Figure 44:
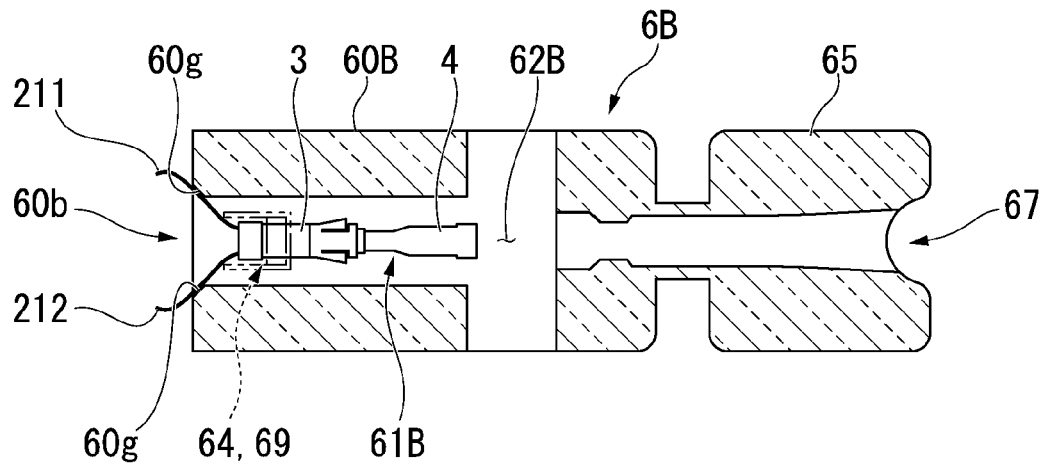
FIG. 44 is a description view showing a method of accommodating the clip unit in the cartridge.
Figure 45:
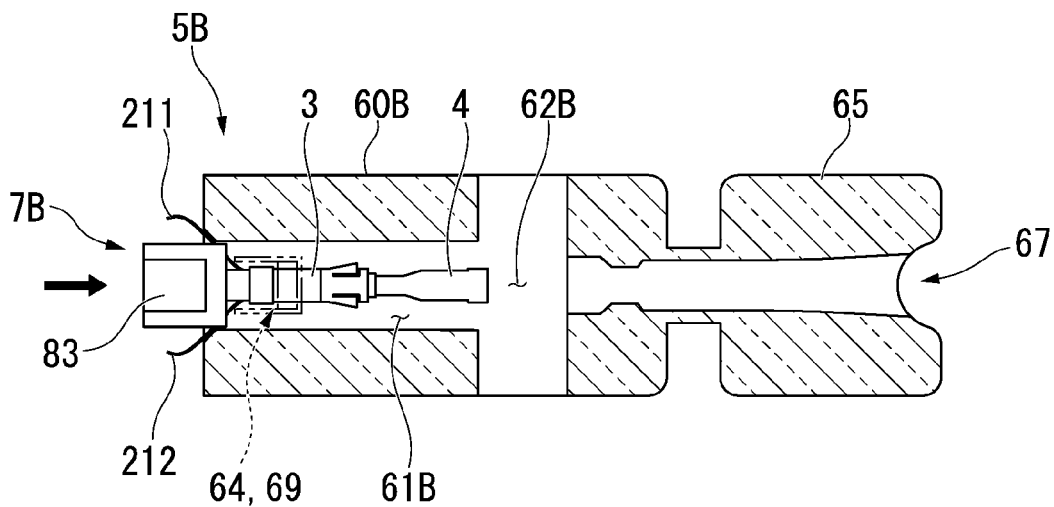
FIG. 45 is a description view showing the method of accommodating the clip unit in the cartridge.
Figure 46:
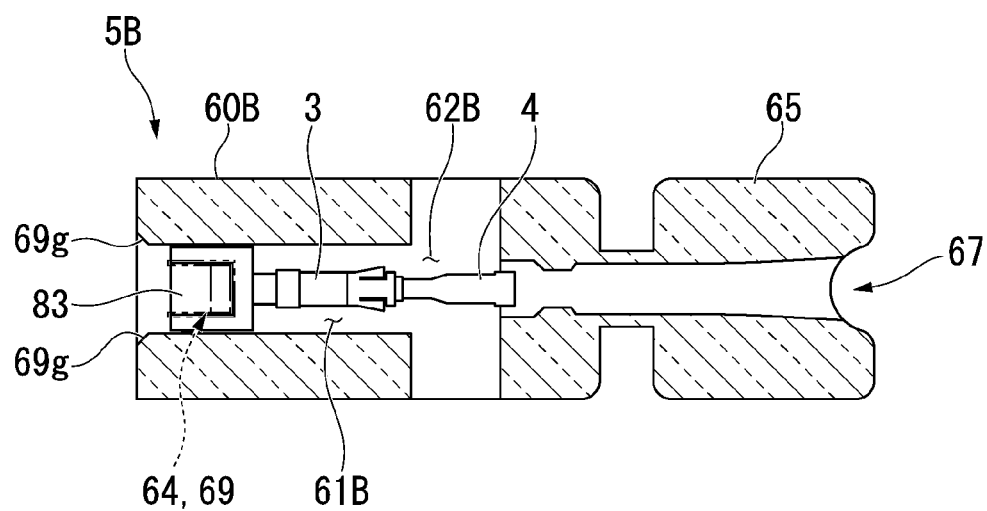
FIG. 46 is a description view showing the method of accommodating the clip unit in the cartridge.

Next, the method of accommodating the clip unit 1 in the cartridge 5B will be described. FIG. 44 to FIG. 46 are views for describing the method of accommodating the clip unit 1 in the cartridge 5B.

As shown in FIG. 44, the user inserts part of the clip unit 1 that does not grasp the regulating member 7B into the accommodation region 68 of the cartridge 5 from the distal-end opening 60b. Next, the user aligns the pair of arms 21 along the guide groove 60g.

As shown in FIG. 45, the user presses the regulating member 7B to the proximal-end side. The pressed regulating member 7B moves the pair of arms 21 toward the proximal-end side. The pair of arms 21 are guided by the guide surface 60m of the guide groove 60g to gradually enter the closed state. Even in the case in which the pair of arms 21 are inclined with respect to the horizontal plane HP, the pair of arms 21 are guided by the side surfaces 60s of the guide groove 60g to become horizontal with respect to the horizontal surface HP.

As shown in FIG. 46, the regulating member 7B in the state of being grasped by the pair of arms 21 is inserted into the first region 61B by further pressing the regulating member 7B toward the proximal-end side. Compared with the first embodiment, the user does not need to close the pair of arms 21 and make the pair of arms 21 to grasp the regulating member 7B by hands. The following method of accommodating the clip unit 1 is the same with that according to the first embodiment.

According to the cartridge system 100B disclosed in the present embodiment, it is easy to load the clip unit 1 into the clip introduction device 200 without the clip 2 having the self-expanding force being locked to the closed state by the pressing tube 3.

According to the cartridge system 100B disclosed in the present embodiment, even if the distal-end opening 60b of the cartridge 5B into which the clip unit 1 is inserted is not closed by a lid or the like, it is possible to load the clip unit 1 into the clip introduction device 200 by regulating the passage of the regulating member 7B and the clip unit 1 moving to the distal-end side by the locking portion 64 and the second locking portion 69. On the other hand, the locking portion 64 and the second locking portion 69 allow the regulating member 7B and the clip unit 1 moving to the proximal-end side to pass therethrough such that it is easy to insert the clip unit 1 into the cartridge 5B.

As mentioned above, the second embodiment of the present disclosure is described by referring to figures, however, the specific configuration is not limited to the present embodiment, and the design changes within the scope not departing from the spirit of the present disclosure are also included. Also, the configuration elements in the above-described embodiments and the modification examples shown below can be appropriately combined.

Third Embodiment

The third embodiment of the present disclosure will be described by referring to FIG. 47 to FIG. 54. In the following description, the configurations being common to the described configurations will be designated with the same reference sign and the duplicate description will be omitted. A cartridge system 1000 according to the third embodiment is different when compared with the cartridge system 100 in the configuration of the locking portion 64.

Figure 47:
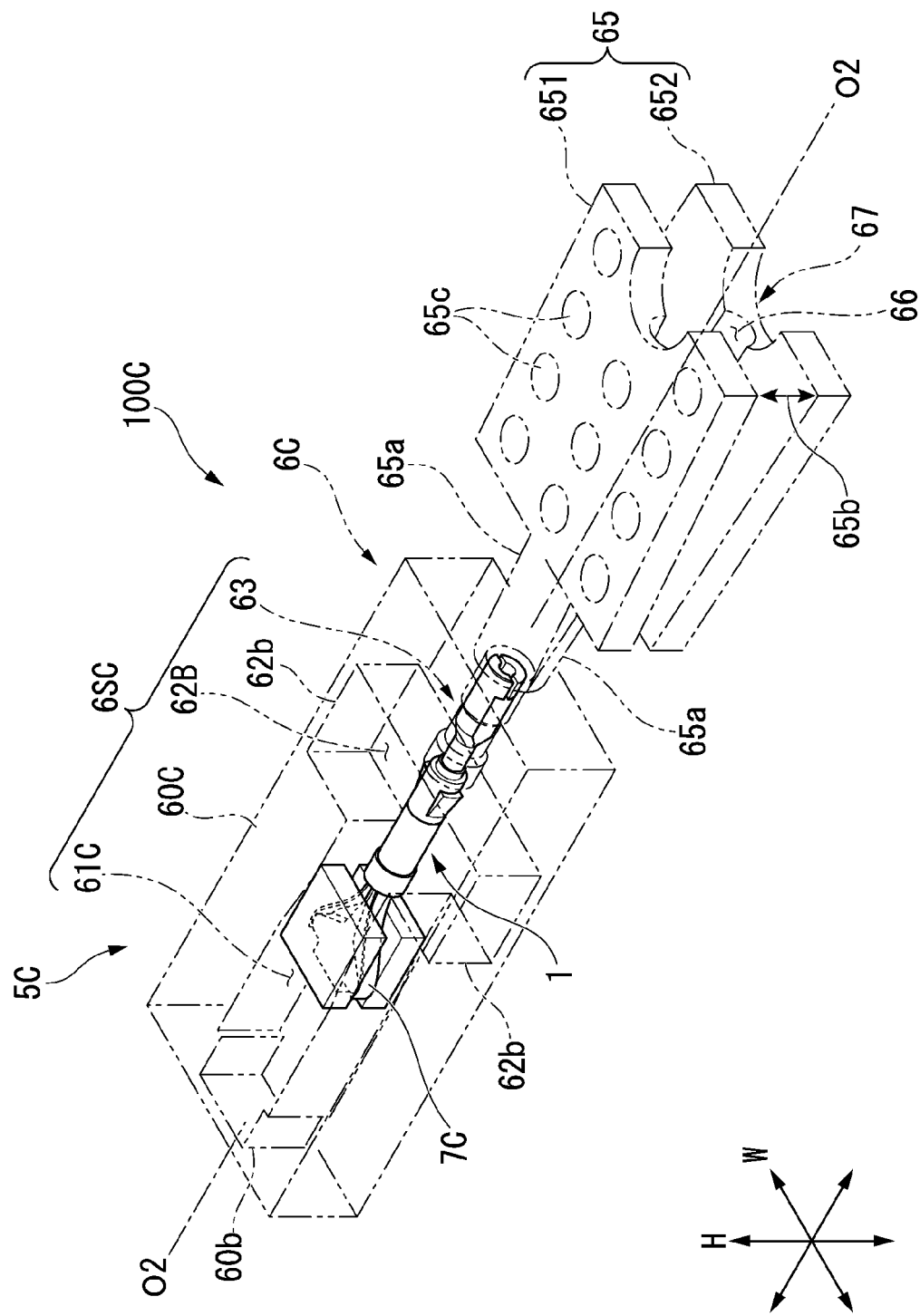
FIG. 47 is a perspective view showing a cartridge system according to a third embodiment.

FIG. 47 is a perspective view showing the cartridge system 100C.

The cartridge system 100C includes the clip unit 1 and a cartridge 50 accommodating the clip unit 1.

Figure 48:
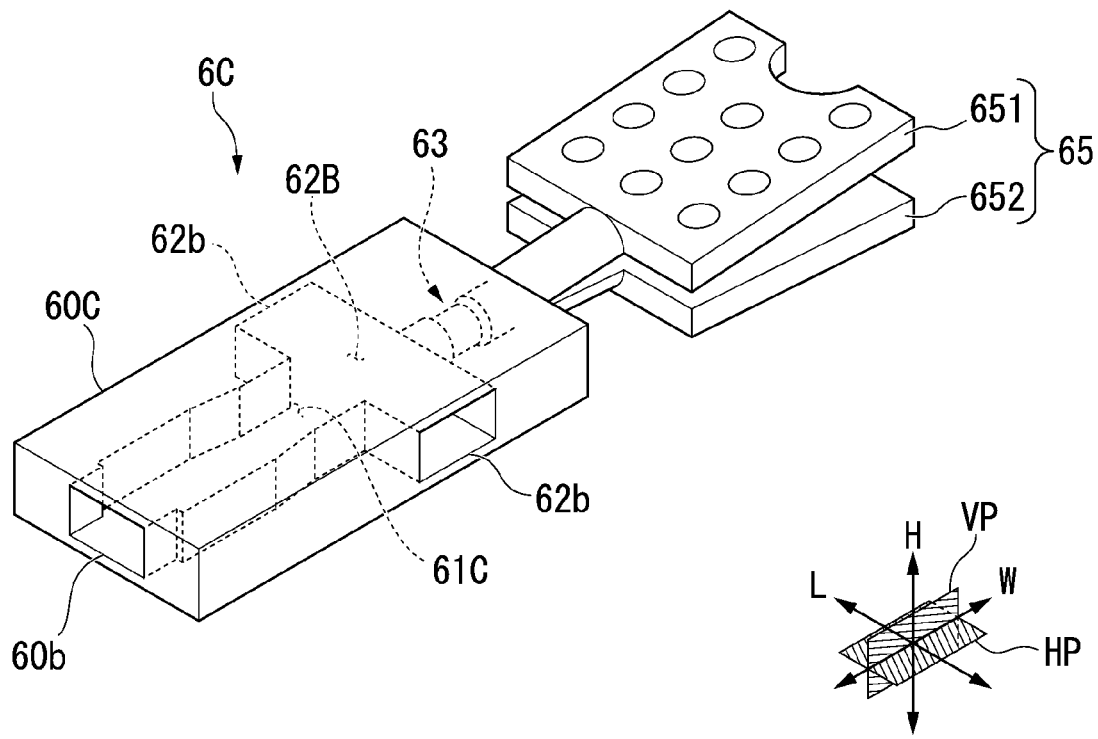
FIG. 48 is a perspective view showing a case of a cartridge of the cartridge system.

FIG. 48 is a perspective view showing a case 6C.

The cartridge 50 includes the case 6C and the regulating member 7C. The length of the cartridge 50 in the longitudinal direction L is about 50 mm, the width thereof is about 10 mm to 20 mm, and the thickness thereof is about 5 mm such that the cartridge 50 is formed in the dimension to be easily grasped by hands.

Similar to the first embodiment, the two directions being orthogonal to the longitudinal direction L of the cartridge 5C while being orthogonal to each other are defined as the "width direction W" and the "height direction H". The plane being horizontal to the Longitudinal direction L and the width direction W is defined as the "horizontal plane HP". The plane being horizontal to the longitudinal direction L and the height direction H is defined as the "vertical plane VP". In the cartridge 50 accommodating the clip unit 1, the side of the pair of arms 21 is defined as the distal-end side of the cartridge 5C, and the side of the connection member 4 is defined as the proximal-end side of the cartridge 5C.

The case 6C includes a case main body 60C, the squeezing portion 65, and the sheath connection portion 66. The case 6C is formed from the same material and by the same method with that of the case 6 according to the first embodiment.

The case main body 600 is formed in the rectangular box shape. The length of the case main body 600 in the width direction W is longer than the length of the case main body 600 in the height direction H.

An accommodation region 6SC for accommodating the clip unit 1 to be movable in the longitudinal direction Lis formed in the case main body 60C. The accommodation region 6SC includes a first region 61C, the second region 62B, and the folding portion 63. The first region 61C, the second region 62B, and the folding portion 63 are arranged from the distal end toward the proximal end in this sequence in the longitudinal direction L. The first region 61c, the second region 62B, and the folding portion 63 are the inside space being symmetrically formed with respect to the vertical plane VP including the central axis O2 of the cartridge 5C in the longitudinal direction L.

Figure 49:
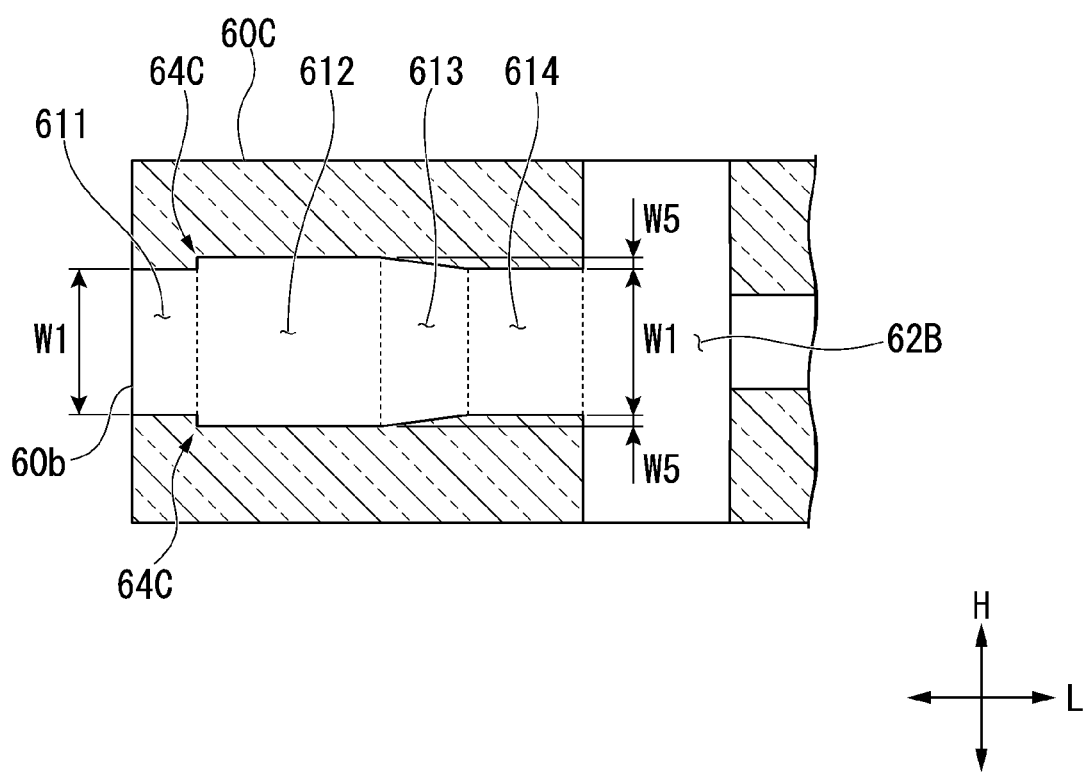
FIG. 49 is a cross-sectional view showing the case.

FIG. 49 is a cross-sectional view showing the case 60.

The first region 61C is the inside space for accommodating the clip unit 1 to be movable in the longitudinal direction L. The first region 61C communicates with the second region 62B. The first region 610 includes the locking portion 64C.

The first region 61c includes a distal-end region 611, a diameter-enlarging region 612, a tapered region 613, and a proximal-end region 614. The distal-end region 611, the diameter-enlarging region 612, the tapered region 613, and the proximal-end region 614 are arranged in this sequence from the distal end toward the proximal end in the longitudinal direction L.

Similar to the first region 61 according to the first embodiment, the distal-end region 611 and the proximal-end region 614 are the inside space having the length W1 in the width direction W.

The diameter-enlarging region 612 is the region whose length in the width direction w is larger than that of the distal-end region 611 and the proximal-end region 614. One side of the diameter-enlarging region 612 in the width direction W is longer than the distal-end region 611 and the proximal-end region 614 only by the length W5. The other side of the diameter-enlarging region 612 in the width direction W is longer than the distal-end region 611 and the proximal end region 614 only by the length W5. The length (W1+2×W5) of the diameter-enlarging region 612 in the width direction W is smaller than the open width W3 of the pair of arms 21 in the open state.

The tapered region 613 is formed in the tapered shape in which the length in the width direction W becomes smaller as toward the proximal end from the distal end. The length in the width direction W at the distal end of the tapered region 613 is equal to the length (W1+2×W5) of the diameter-enlarging region 612 in the width direction W. The length in the width direction W at the proximal end of the tapered region 613 is equal to the length W1 of the proximal-end region 614 in the width direction W.

The locking portion 64C is a step portion in the width direction W formed between the distal end region 611 and the diameter-enlarging region 612. The locking portions 64C are formed at two sides in the width direction w. The locking portion 64C may be provided only at one side in the width direction w.

The regulating member 70 is accommodated in the first region 61C and the second region 62B to be movable therein together with the clip unit 1. The regulating member 7C is the same member with the regulating member 7 according to the first embodiment except for the point that the engagement concave portion 83 is not included.

[Method of Accommodating Clip Unit 1]

Figure 51:
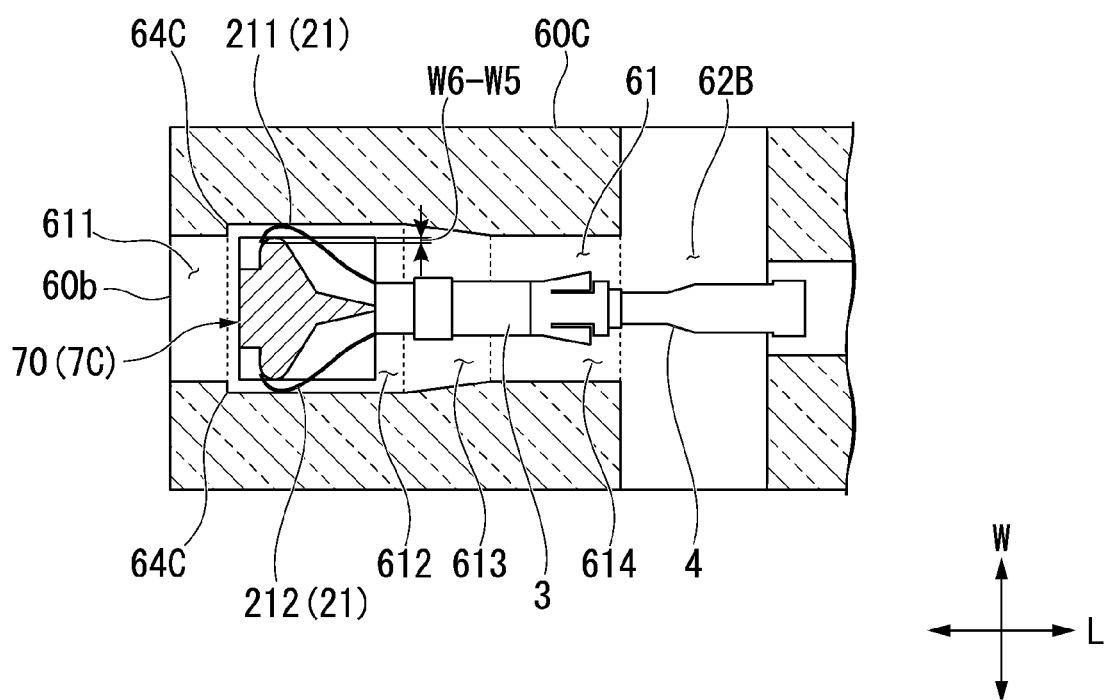
FIG. 51 is a description view showing the method of accommodating the clip unit in the cartridge.

Next, a method of accommodating the clip unit 1 into the cartridge 50 will be described. FIG. 51 to FIG. 51 are views for describing the method of accommodating the clip unit 1 in the cartridge 5C.

Figure 50:
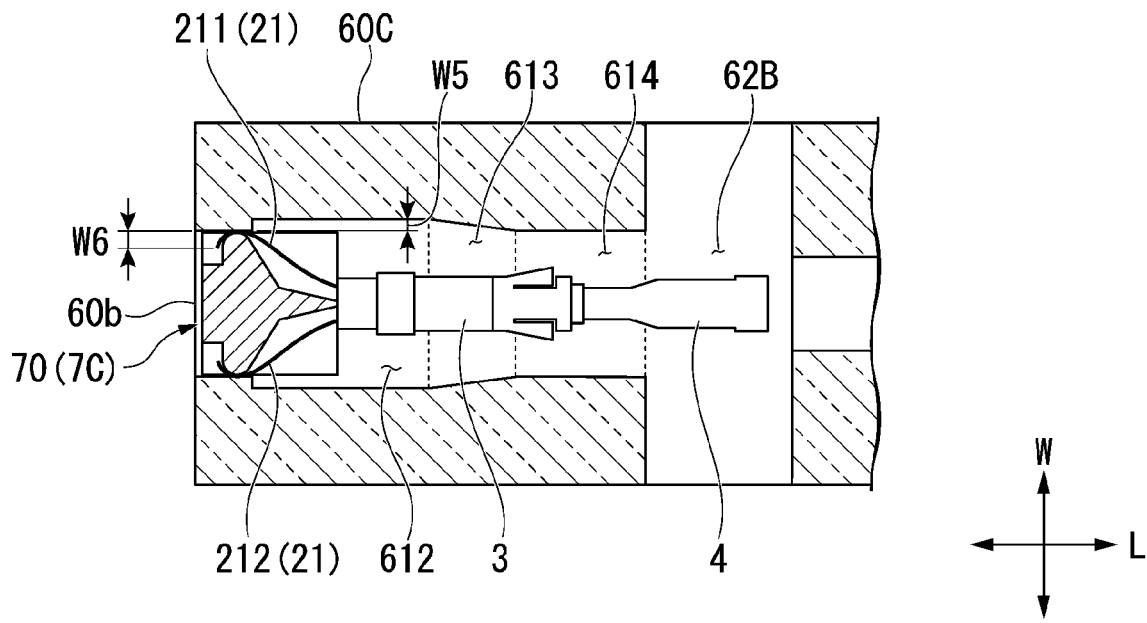
FIG. 50 is a description view showing a method of accommodating the clip unit in the cartridge.

The user closes the pair of arms 21 by hands and the like to grasp the regulating member 7C by the pair of arms 21. Next, as shown in FIG. 50, the user inserts the clip unit 1 grasping the regulating member 7C into the accommodation region 6SC of the cartridge 5C from the distal-end opening 60b. In the distal-end region 611, the length W6 (grasping amount) in the width direction W of the portion where the first arm 211 grasps the regulating member 70 is longer than the length W5.

As shown in FIG. 51, the user presses the regulating member 7C to the proximal-end side to move the clip unit 1 toward the proximal-end side. The locking portion 64C allows the regulating member 7C and the clip unit 1 moving toward the proximal-end side to pass therethrough. When the regulating member 7C moves from the distal end region 611 to the diameter-enlarging region 612, the length of the inside space in the width direction w becomes longer such that the pair of arms 21 are slightly open. However, the length W6 is longer than the length W5 such that even the pair of arms 21 are slightly open, the state in which the pair of arms 21 grasp the regulating member 7C will be maintained.

[Method of Loading Clip Unit 1]

Figure 52:
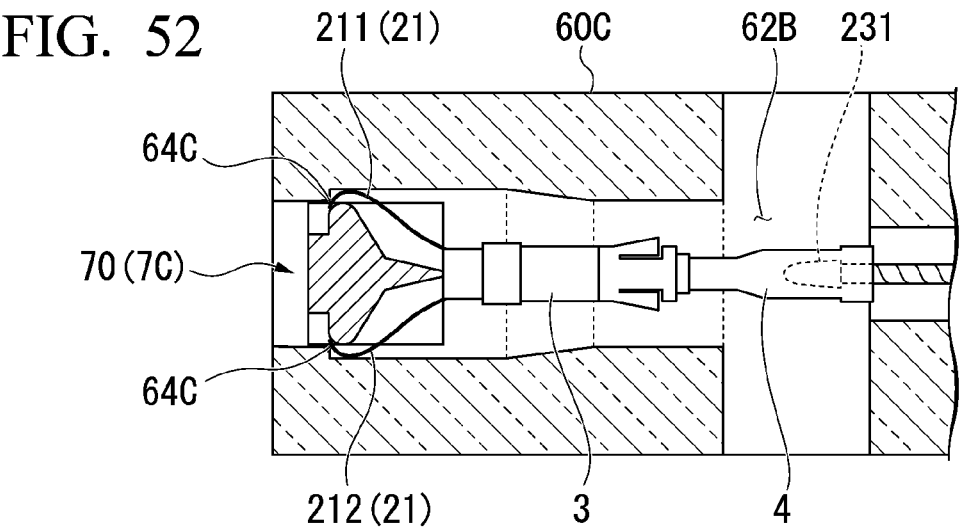
FIG. 52 is a description view showing a method of loading the clip unit in a clip introduction device.
Figure 53:
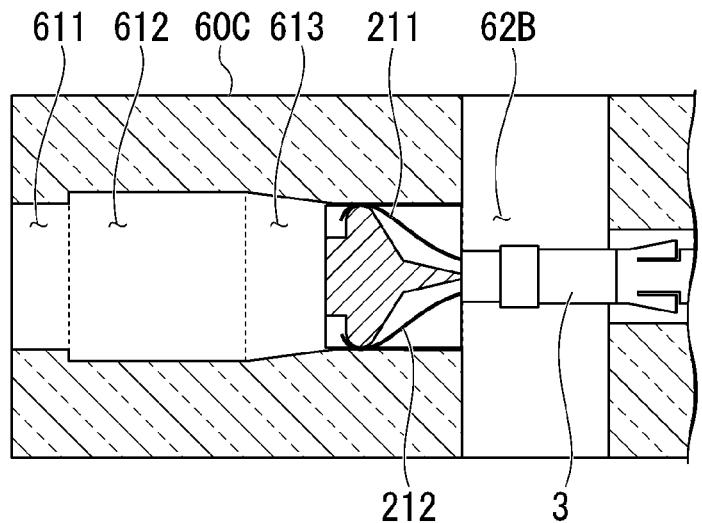
FIG. 53 is a description view showing the method of loading the clip unit in a clip introduction device.

Next, the method of loading the clip unit 1 into the clip introduction device 200 using the cartridge 50 will be described. FIG. 52 to FIG. 53 are views showing the method of loading the clip unit 1 into the clip introduction device 200 using the cartridge 5C.

The user inserts the sheath 220 of the clip introduction device 200 into the accommodation region 6SC of the case 60 from the proximal-end opening 67 of the sheath connection portion 66. The user squeezes the sheath 220 by the squeezing portion 65 to fix the sheath 220 with respect to the case 6C.

As shown in FIG. 52, the user operates the operation portion 240 to advance the operation wire 230 toward the sheath 220 so as to advance the arrowhead hook portion 231. The arrowhead hook portion 231 advances the connection portion 4 such that the regulating member 7C and the clip unit 1 advance. The regulating member 7C moves from the proximal-end side toward the distal end side such that the pair of arms 21 abut to and engage with the locking portion 640. As a result, it is impossible for the clip unit 1 to advance to the distal-end side from that position. In other words, the locking portion 64C regulates the passage of the clip unit 1 moving toward the distal-end side. The advancing arrowhead hook portion 231 is sandwiched by the elastic arm portion 44 of the connection member 4 of the clip unit 1 to be connected with the connection portion 4.

The user pulls the operation wire 230. The clip 2 of the clip unit 1 is pulled to the proximal-end side by the connection member 4 that is connected with the arrowhead hook portion 231. As shown in FIG. 53, when the regulating member 70 moves from the diameter-enlarging region 612 to the tapered region 613, the length of the inside space in the width direction W becomes longer such that the pair of arms 21 are slightly closed. When the regulating member 7C moves from the tapered region 613 to the proximal-end region 614, the pair of arms 21 firmly grasp the regulating member 7C. The following method of loading the clip unit 1 is the same with that according to the first embodiment.

According to the cartridge system 1000 disclosed in the present embodiment, it is easy to load the clip unit 1 into the clip introduction device 200 without the clip 2 having the self-expanding force being locked to the closed state by the pressing tube 3.

According to the cartridge system 100C disclosed in the present embodiment, even if the distal-end opening 60b of the cartridge 5C into which the clip unit 1 is inserted is not closed by a lid or the like, it is possible to load the clip unit 1 into the clip introduction device 200 by regulating the passage of the regulating member 7C and the clip unit 1 moving to the distal-end side by the locking portion 64C. On the other hand, the locking portion 64C allows the regulating member 7C and the clip unit 1 moving to the proximal-end side to pass therethrough such that it is easy to insert the clip unit 1 into the cartridge 5C.

As mentioned above, the third embodiment of the present disclosure is described by referring to figures, however, the specific configuration is not limited to the present embodiment, and the design changes within the scope not departing from the spirit of the present disclosure are also included. Also, the configuration elements in the above-described embodiments and the modification examples shown below can be appropriately combined.

Modification Example 3-1

Figure 54:
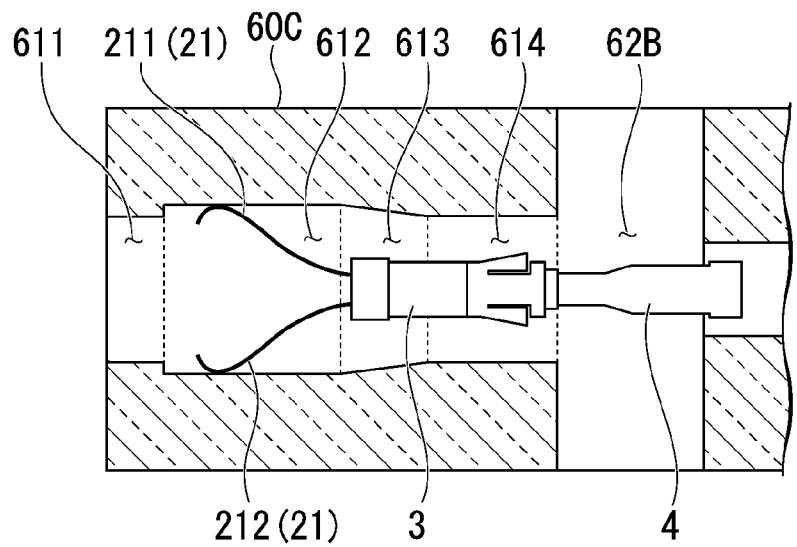
FIG. 54 is a view showing the case that accommodates the clip unit without using the regulating member.

For example, in the above-described embodiment, the cartridge 50 includes the regulating member 7C; however, the regulating member 7C is not essential. FIG. 54 is a view showing the case 60 accommodating the clip unit 1 without using the regulating member 7C.

In the case of accommodating the clip unit 1 in the case 6C, the user presses the clip unit 1 to the proximal-end side to move the clip unit 1 to the proximal-end side. The pair of arms 21 inserted in the first region 61C abut to the case main body 600 in the open-close direction P.

At the time of loading the clip unit 1 into the clip introduction device 200, the user advances the arrowhead hook portion 231. The arrowhead hook portion 231 advances the connection member 4 such that the clip unit 1 advances. The clip unit 1 moves from the proximal-end side toward the distal-end side such that the pair of arms 21 having the self-expanding force abut to and engage with the locking portion 640. As a result, it is impossible for the clip unit 1 to advance to the distal-end side from that position. In other words, the locking portion 64C regulates the passage of the clip unit 1 moving to the distal-end side. The advancing arrowhead hook portion 231 is sandwiched by the elastic arm portion 44 of the connection member 4 of the clip unit 1 and connected with the connection member 4. The following method of loading the clip unit 1 is the same with that according to the first embodiment.

Modification Example 3-2

According to the above-described embodiment, the clip 2 is configured to have the first arm 211 and the second arm 212; however, the aspect of the clip 2 is not limited to the configuration. The clip 2 only has to include a plurality of arms being openable and closable, for example, the clip 2 may have four arms.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. For example, the configuration according to any one of above-described embodiments and modifications of the present disclosure may be appropriately combined with each modification of the operation section. The present disclosure is not limited by the above description, but only by the appended claims.

What is claimed is:

1. A cartridge system, comprising:
   a clip unit, comprising:
   a plurality of arms being openable and closeable; and
   a connection member that is connectable with a power transmission portion inserting through a sheath, and
   a case, comprising:
   an accommodation region in which the clip unit is accommodated;
   a distal-end opening provided at a distal-end side of the accommodation region and into which the clip unit is insertable;
   a proximal-end opening provided at a proximal-end side of the accommodation region and into which the sheath is insertable; and
   a locking portion configured to allow a movement of the clip unit being inserted from the distal-end opening toward the accommodation region and regulate a movement of the clip unit from the accommodation region toward the distal-end opening.

2. The cartridge system according to claim 1, further comprises a regulating member that is able to be grasped by the plurality of arms and movable in the accommodation region,
   wherein the regulating member includes a concave portion at least one side in a height direction,
   the locking portion is a convex portion provided in the accommodation region, and
   the looking portion is engaged with the concave portion of the regulating member so as to regulate the movement of the clip unit from the accommodation region toward the distal-end opening.

3. The cartridge system according to claim 2, wherein the locking portion is configured to allow the movement of the clip unit toward the accommodation region by an elastic deformation of the engagement portion.

4. The cartridge system according to claim 2,
   wherein the locking portions are arranged at two sides in the height direction in the accommodation region, and
   the regulating member includes the concave portions at the two sides in the height direction.

5. The cartridge system according to claim 2,
   wherein the regulating member includes an upper-layer member, a middle layer member, and a lower-layer member,
   the middle-layer member is sandwiched by the upper-layer member and the lower-layer member in the height direction, and
   the middle-layer member comprises:
   a protruding portion that protrudes in a protruding direction being orthogonal to a central axis of the regulating member; and
   a tapered portion provided at a proximal-end side of the regulating member, wherein a length of the tapered portion in the protruding direction becomes shorter as toward the proximal-end side.

6. The cartridge system according to claim 5, wherein the concave portion is formed in at least one of the upper-layer member and the lower-layer member.

7. The cartridge system according to claim 1, wherein a guide groove for guiding the plurality of arms are provided at the distal-end opening.

8. The cartridge system according to claim 1,
   wherein the clip unit is accommodated in the accommodation region such that an open-close direction of the plurality of arms are substantially coincided with a width direction orthogonal to a central axis of the accommodation region, and
   the locking portion is a step portion provided in an end portion of the accommodation region in the width direction.

9. The cartridge system according to claim 8, further comprises a regulating member that is able to be grasped by the plurality of arms and movable in the accommodation region,
   wherein the step portion is formed in the width direction of the accommodation region and between a distal-end region at the distal-end opening side and a diameter-enlarging region at the proximal-end side of the distal-end region, and
   a grasping amount of one of the plurality of arms grasping the regulating member in the distal-end region is larger than a length of the step portion in the width direction.

10. The cartridge system according to claim 9, wherein the accommodation region includes a tapered region at the proximal-end side of the diameter-enlarging region, and a length of the tapered region in the width direction becomes shorter as toward a proximal end from a distal end.

11. A cartridge for accommodating a clip unit including a plurality of arms being openable and closeable and a connection member being connectable with a power transmission portion inserting through a sheath, the cartridge comprises:
    a case, comprising:
    an accommodation region in which the clip unit is accommodated;
    a distal-end opening provided at a distal-end side of the accommodation region and into which the clip unit is insertable;
    a proximal-end opening provided at a proximal-end side of the accommodation region and into which the sheath is insertable; and
    a locking portion configured to allow the clip unit that is inserted from the distal-end opening to move toward the proximal-end side to pass therethrough, and regulate a passage of the clip unit moving to the distal-end side toward the distal-end opening.

12. The cartridge according to claim 11, further comprises a regulating member that is able to be grasped by the plurality of arms and movable in the accommodation region,
    wherein the regulating member includes a concave portion at least one side in a height direction,
    the locking portion is a convex portion provided in the accommodation region, and the locking portion is engaged with the concave portion of the regulating member so as to regulate the passage of the clip unit moving toward the distal end side.

13. The cartridge system according to claim 12, wherein the locking portion is configured to allow the clip unit moving to the proximal-end side to pass therethrough by an elastic deformation of the engagement portion.

14. The cartridge system according to claim 12,
wherein the locking portions are arranged at two sides in the height direction in the accommodation region, and
the regulating member includes the concave portions at the two sides in the height direction.

15. The cartridge system according to claim 12,
wherein the regulating member includes an upper-layer member, a middle-layer member, and a lower-layer member,
the middle-layer member is sandwiched by the upper-layer member and the lower-layer member in the height direction, and
the middle-layer member comprises:
 a protruding portion that protrudes in a protruding direction being orthogonal to a central axis of the regulating member; and
 a tapered portion provided at a proximal-end side of the regulating member, wherein a length of the tapered portion in the protruding direction becomes shorter as toward the proximal-end side.

16. The cartridge system according to claim 15, wherein the concave portion is formed in at least one of the upper-layer member and the lower layer member.

17. The cartridge system according to claim 11, wherein a guide groove for guiding the plurality of arms are provided at the distal-end opening.

18. A loading method of a clip unit for loading a clip unit into a clip introduction device having a sheath, the loading method comprises:
 inserting the sheath into a case having a distal-end opening into which the clip unit is insertable and in which the clip unit is accommodated;
 moving a power transmission portion inserting through the sheath toward the clip unit in a state in which the sheath is inserted into the case;
 moving the clip unit in a direction approaching the distal-end opening by abutting the power transmission portion to the clip unit; and
 connecting the clip unit and the power transmission portion by regulating the clip unit from passing through the distal-end opening by a locking portion provided in the case.

19. The loading method of a clip unit according to claim 18, further comprising accommodating the clip unit that has passed through the locking portion within the case by abutting the clip unit moving to the proximal-end side to the locking portion to cause the locking portion to be elastically deformed before connecting the connection member and the power transmission portion.

20. The loading method of a clip unit according to claim 18, further comprising regulating the clip unit that has moved in the direction approaching the distal end opening from passing through the distal-end opening by engaging the regulating member grasped by the clip unit with the locking portion.

* * * * *